(12) United States Patent
Rotheroe

(10) Patent No.: US 6,955,023 B2
(45) Date of Patent: Oct. 18, 2005

(54) UNITARY METAL STRUCTURAL MEMBER WITH INTERNAL REINFORCEMENT

(76) Inventor: Kevin Chaite Rotheroe, One Stuyvesant Oval, Unit 9D, New York, NY (US) 10009

( * ) Notice: Subject to any disclaimer, the term of this patent is extended or adjusted under 35 U.S.C. 154(b) by 102 days.

(21) Appl. No.: 10/021,930

(22) Filed: Dec. 13, 2001

(65) Prior Publication Data

US 2002/0152715 A1 Oct. 24, 2002

Related U.S. Application Data

(60) Provisional application No. 60/255,242, filed on Dec. 13, 2000.

(51) Int. Cl.[7] ............................................. E04C 3/30
(52) U.S. Cl. .................... 52/731.2; 52/730.1; 52/731.1; 52/732.1; 52/735.1; 52/737.4; 52/738.1; 52/739.1; 296/146.6; 296/189; 138/172; 138/174; 138/177
(58) Field of Search ............................ 52/730.1, 731.2, 52/731.1, 732.1, 735.1, 737.4, 738.1, 739.1; 296/146.6, 189; 138/172, 174, 177

(56) References Cited

U.S. PATENT DOCUMENTS

| | | | | |
|---|---|---|---|---|
| 745,570 | A | * 12/1903 | Clarke | 52/732.1 |
| 2,092,472 | A | * 9/1937 | Rafter | 52/634 |
| 2,454,640 | A | * 11/1948 | Eichner | 114/90 |
| 2,516,020 | A | * 7/1950 | Reed | 29/897 |
| 4,003,168 | A | * 1/1977 | Brady | 52/118 |
| 5,655,347 | A | * 8/1997 | Mahieu | 52/639 |
| 5,820,202 | A | * 10/1998 | Ju | 296/146.6 |
| 6,068,330 | A | * 5/2000 | Kasuga et al. | 296/189 |
| 6,264,238 | B1 | * 7/2001 | MacDonald et al. | 280/751 |
| 6,290,282 | B1 | * 9/2001 | Hortlund et al. | 296/146.6 |

OTHER PUBLICATIONS

*Laser Engineered Net Shaping (LENS™): A Tool for Direct Fabrication of Metal Parts*, Clint Atwood, Michelle Griffith, Lane Harwell, Eric Schlienger, Mark Ensz, John Smugersky, Tony Romero, Don Greene, Daryl Reckaway, LENS™ Project Team, Sandia National Laboratories, Proceedings of ICALEO '98, Nov. 16–19, 1998, Orlando, FL, p. E–1.

*Laser Engineered Net Shaping*, Michelle Griffith & David Gill, Sandia National Laboratories.

*Laser Consolidation—A Novel One–Step Manufacturing Process from CAD Models to Net–Shape Functional Components*, Lijue Xue & Mahmud–U1 Islam, Integrated Manufacturing Technologies Institute, National Research Council of Canada. Proceedings of the 2002 International Conference on Metal Powder Deposition for Rapid Manufacturing, pp. 61–68. Compiled by David Keicher, James W. Sears, John E. Smugeresky.

*Laser Direct Manufacturing Research at Lockheed Martin*, Brian T. Rosenberger, Lockheed Martin Aeronautics Company. Presentation given at the MPIF Rapid Manufacturing Seminar: Laser and Powder Based Technologies, Oct. 23–24, 2000,Providence RI.

(Continued)

*Primary Examiner*—Carl D. Friedman
*Assistant Examiner*—Steve Varner
(74) *Attorney, Agent, or Firm*—Greer, Burns & Crain, Ltd.

(57) ABSTRACT

A metal unitary structural member for structural support. The member includes a plurality of web portions extending radially from each other and extending with each other in an axial direction, and a plurality of outer portions extending in an axial direction with the web portions and between the web portions in cross-section. The plurality of outer portions defines an outer surface of the member. The web portions may extend from a substantially central portion. The plurality of web portions may include perforations.

37 Claims, 35 Drawing Sheets

OTHER PUBLICATIONS

*The Influence of Processing Parameters on the Formation of Pores and Columnar Grains in Laser Deposited Ti–6al–4v Alloy*, Paul S. Goodwin, Carolyn Mitchell, Jing Liang, Junfa Mei, & Xinhua Wu, QinetiQ. Proceedings of the 2002 International Conference on Metal Powder Deposition for Rapid Manufacturing, pp. 87–95. Compiled by David Keicher, James W. Sears, John E. Smugeresky.

*Direct Metal Laser Sintering—From 100μm 20μm Layers*, J–E. Lind, J. Hanninen, J. Kotila, O. Nyrhila, & T. Syvanen, Rapid Manufacturing Development Group. Proceedings of the 2002 International Conference on Metal Powder Deposition for Rapid Manufacturing, pp. 225–232. Compiled by David Keicher, James W. Sears, John E. Smugeresky.

*Annual Technology Review: P/M on the Move—2003*, Peter K. Johnson, International Journal of Powder Metallurgy, vol. 39, No. 3, May 2003, p. 33.

*Laser Additive Manufacturing*, Company Literature distributed at the Rapid Manufacturing Seminar: Laser and Powder Based Technologies, Oct. 23–24, 2000, Providence RI.

3D Truss, The Ultra–Light 3D Cast Beam Structure, invented by Nu–Cast, Inc.

Extrude Hone ProMetal Rapid Manufacturing literature (4 pages), Sep., 2001.

ProMetal R10 Rapid Metal Production System product literature (2 pages), Extrude Hone ProMetal, Rapid Prototyping & Manufacturing 2002 Conference & Exposition, May 2002, Cincinnati.

EOS M 250 X–tended Brochure, manufacturer's literature (4 pages), EOS of North America, Rapid Prototyping & Manufacturing 2003 Conference & Exposition, May 2003, Chicago.

EOS S 750 Brochure, manufacturer's literature (4 pages), EOS of North America, Rapid Prototyping & Manufacturing 2003 Conference & Exposition, May 2003, Chicago.

*Prototyping for Direct Metal Casting: Data to Castings in 12 Hours*, Modern Casting, Jun. 2003, vol. 93, No. 6, pp. 65–66 (no author cited), Rapid Prototyping & Manufacturing 2002 Conference & Exposition, May 2002, Cincinnati.

* cited by examiner

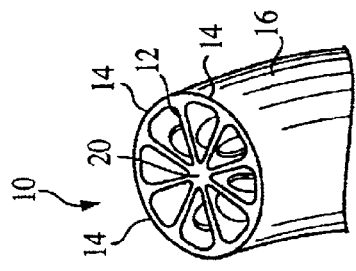
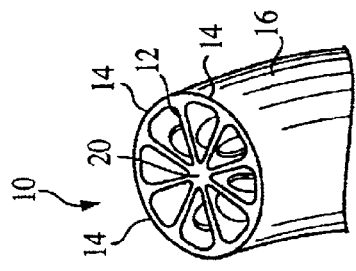
FIG. 5D
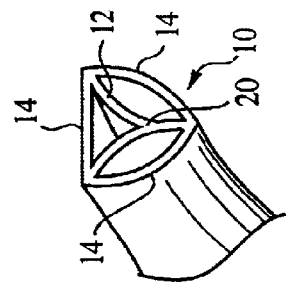
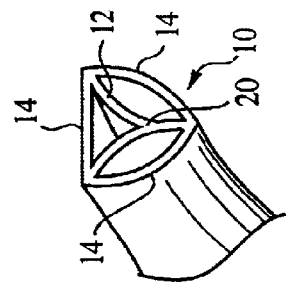
FIG. 6D
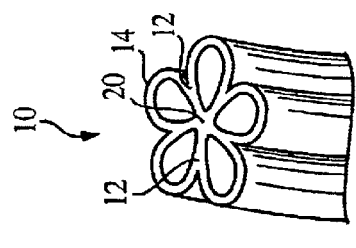
FIG. 5C
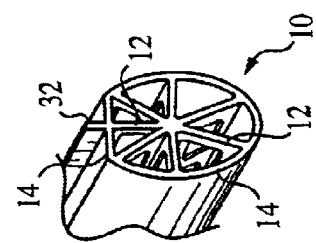
FIG. 6C
FIG. 5B
FIG. 6B
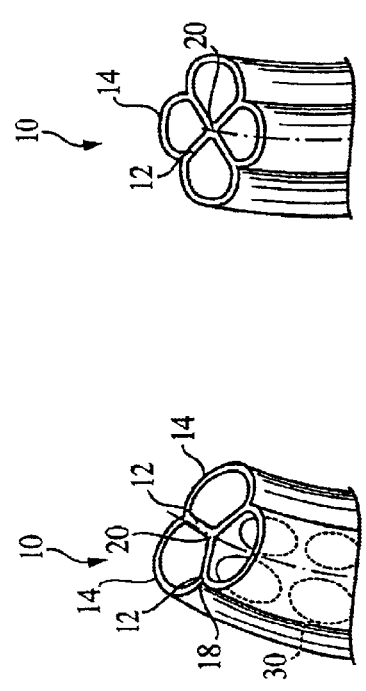
FIG. 5A
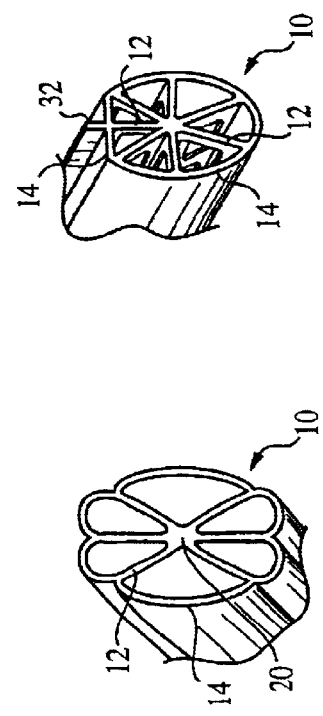
FIG. 6A

FIG. 9

UNITARY METAL STRUCTURAL MEMBER WITH INTERNAL REINFORCEMENT

CLAIM FOR PRIORITY

This application claims the benefit of U.S. Provisional Application No. 60/255,242, filed Dec. 13, 2000, under 35 U.S.C. §119.

FIELD OF THE INVENTION

The present invention relates generally to structural members.

BACKGROUND OF THE INVENTION

Metal structural members have a wide-ranging applicability as components in various types of structural frames. The members may be used, for example, in aircrafts and automobiles to form a structural frame. The members might also find applicability in building construction and consumer devices. Another potential application is in spacecraft. The members are typically elongated components. A critical property for structural members is strength to weight ratio. Weight is an obvious drawback in many applications, just as strength is an obvious advantage.

Conventional structural metal members are composed of rolled or extruded components with constant cross-sectional size and shape, and a constant wall thickness. Typically, the cross-section of a member is circular so that the overall shape of the support member is cylindrical. However, the member may have a rectilinear cross-section. Generally, the strength to weight ratio in these types of members is a function of the material and the wall thickness, which might be thick enough to form a substantially solid member in some instances or a substantially hollow member in other instances.

Selection or design of a particular component with a specific wall thickness and cross-sectional geometry is determined by the maximum loads and stresses a particular portion or portions of that member will be required to transfer or absorb in specified service conditions. Put another way, the cross-sectional size and wall thickness of the entire length of the structural member is dictated by the point or points of maximum stress (plus an added safety factor), and the component is oversized (i.e., contains excess material and strength) elsewhere along its straight or curvilinear length. Increased wall thickness of a hollow support member increases the strength of the member (up to an internally solid structure), but with a resultant increase in the materials needed to produce the member, and the overall weight of the member. Likewise, the cross-sectional size can be increased with a resultant increase in materials.

SUMMARY OF THE INVENTION

The present invention provides a metal unitary member with a number of features having parameters that can be varied alone or in combination with other parameters to customize configuration of the members for a particular service environment. A unitary structural member of the invention includes a plurality of web portions extending radially from each other and extending with each other in an axial direction. A plurality of outer portions extend in an axial direction with the web portions and extend between the web portions in cross-section. The plurality of outer portions define a radially outer surface of the member. The axial directions of the web portions and outer portions may be straight or curvilinear so that the web portions and outer portions may be straight or curvilinear in trajectory.

Preferably, the plurality of web portions extend radially from a substantially central portion that extends in an axial direction with the web portions and the outer portions. The axial direction of the substantially central portion may be straight or curvilinear. The central portion, the plurality of web portions and/or the outer portions of the unitary tubular member may have a linear or curvilinear trajectory in a radial direction.

Preferably, the plurality of web portions includes a plurality of perforations. The plurality of web portions may vary in radial length at various axial positions along the member. The outer portions spanning between the web portions may expand in arc length, and as a result, the unitary tubular member may vary in cross-sectional size and/or shape. The outer portions preferably are arched, but may instead be otherwise curvilinear or linear in configuration to form complex and variable shapes and/or variable sizes of the cross-section of the member. The web portions may be disposed at substantially equal intervals, disposed with varying intervals but symmetrically, or disposed at varying intervals to produce an asymmetrical cross-section. By varying the shape and/or length of the outer portions and the number, configuration, or positioning of the web portions, a variety of cross-sectional shapes and sizes can be designed and optimized for particular service conditions.

BRIEF DESCRIPTION OF THE DRAWINGS

FIGS. 5A–5D are simplified drawings of embodiments of the unitary structural member having varying numbers and configurations of web portions;

FIGS. 6A–6D are simplified sketches of unitary structural members having varying numbers and/or shapes of web portions and/or outer portions;

FIG. 9 illustrates computer-aided manufacturing processes, including some for forming unitary structural members of the invention;

DETAILED DESCRIPTION OF THE INVENTION

A metal unitary structural member of the invention includes a plurality of web portions extending radially from one another and extending with each other in an axial direction, and a plurality of outer portions extending between the web portions in cross-section. A high strength to weight ratio is achieved, especially with the use of preferred perforations in the web. Advantageously, the general invention admits of variations for one or more of the portions of the unitary tubular member, e.g., the trajectory of the web portions or outer portions, or the variation of the radial length of the web portions along the axial length. These and other variations of the general invention permit a designer to customize various features of the unitary member for particular uses or operating environments, such as for specific aspects of their intended service conditions, with a greater flexibility in customization than many conventional designs. In addition, designers are freed from basing a complete design of a structural member on its point of maximum stress.

Figure 1:
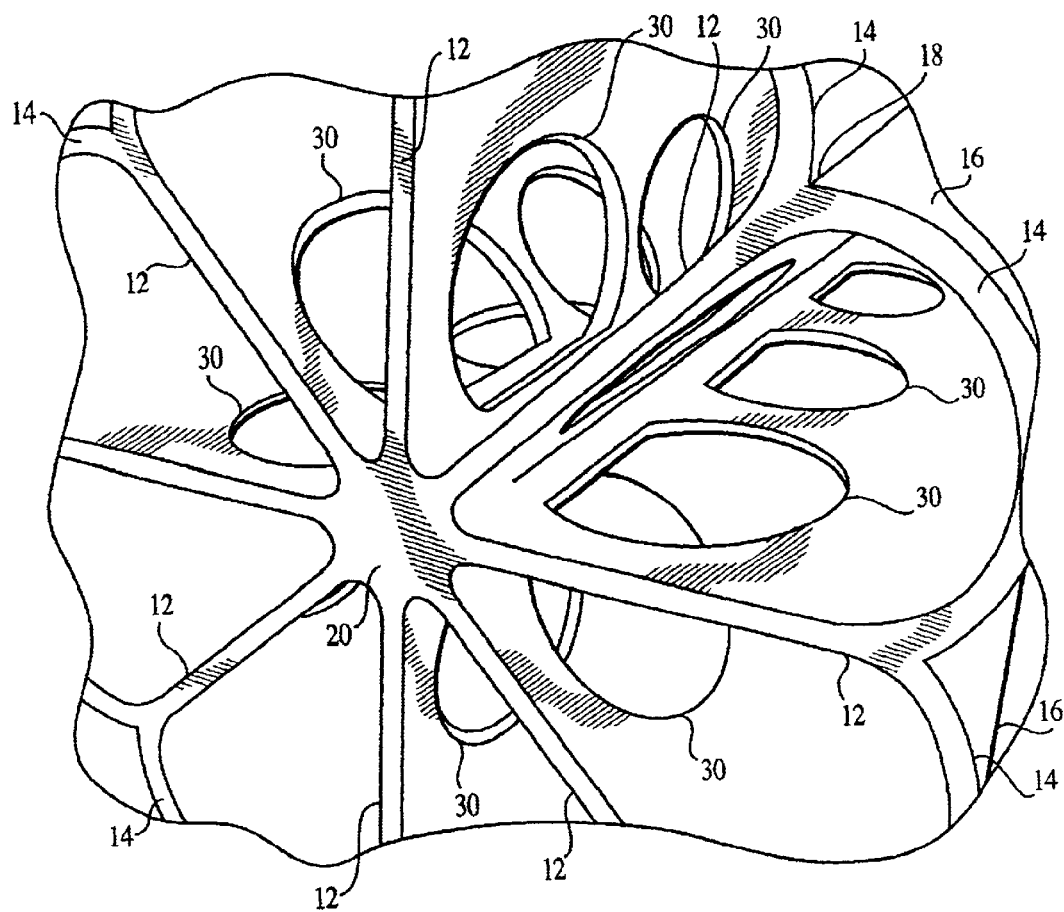
FIG. 1 is an enlarged end view of a unitary structural member according to one embodiment of the present invention.

Referring now to the drawings, FIG. 1 shows a first, preferred type of embodiment unitary metal structural member 10 according to the present invention, and illustrates a number of preferred features. To provide reinforcing support (stiffness or strength, for example) to the unitary structural member 10, and to increase the strength-to-weight ratio of the member, a plurality of web portions 12 are provided, which extend with each other in an axial direction, and extend radially from each other. The axial direction of the web portions 12 may be linear or curvilinear in trajectory. The web portions 12 may be linear in radial trajectory (as shown in FIG. 1) or curvilinear, as shown by example in FIG. 2 and extend between outer portions 14. Radial, as used herein, indicates a trajectory, whether linear or curvilinear, that originates at the intersection of web portions at any point along an axial extension thereof and extends to an outer portion 14 at any point along an axial extension thereof. In segments, the web portions 12 form an internal reinforcement structure for the unitary structural member 10. The number and radial length and/or shape of included web portions 12 may vary according to, for example, the size and intended service conditions of the particular unitary structural member 10. Preferably, though, the unitary structural member 10 includes at least three web portions 12 for distributing a load applied to the member.

Extending between the plurality of web portions 12 in cross-section, a plurality of outer portions 14 extend around the unitary structural member 10 and in an axial direction with the web portions 12, to define in combination an outer surface 16 of the unitary structural member. The outer surface 16 may be of a complex cross-sectional shape, such as the shape formed by the arched outer portions 14 shown in FIG. 1, or may be, for example, circular or rectilinear in cross-section. The preferred arched configuration for the outer portions 14 further enhances structural integrity of the unitary structural member 10. Loads applied to outer portions of the arched outer portions 14 (lateral loads) in the embodiment shown in FIG. 1 are efficiently directed to and through one or more of plurality of web portions 12. This preferred type of the unitary structured member 10 improves stiffness of the internal reinforcement for the unitary structural member and facilitates optimal distribution of lateral loads to the internal plurality of web portions 12.

Figure 2:
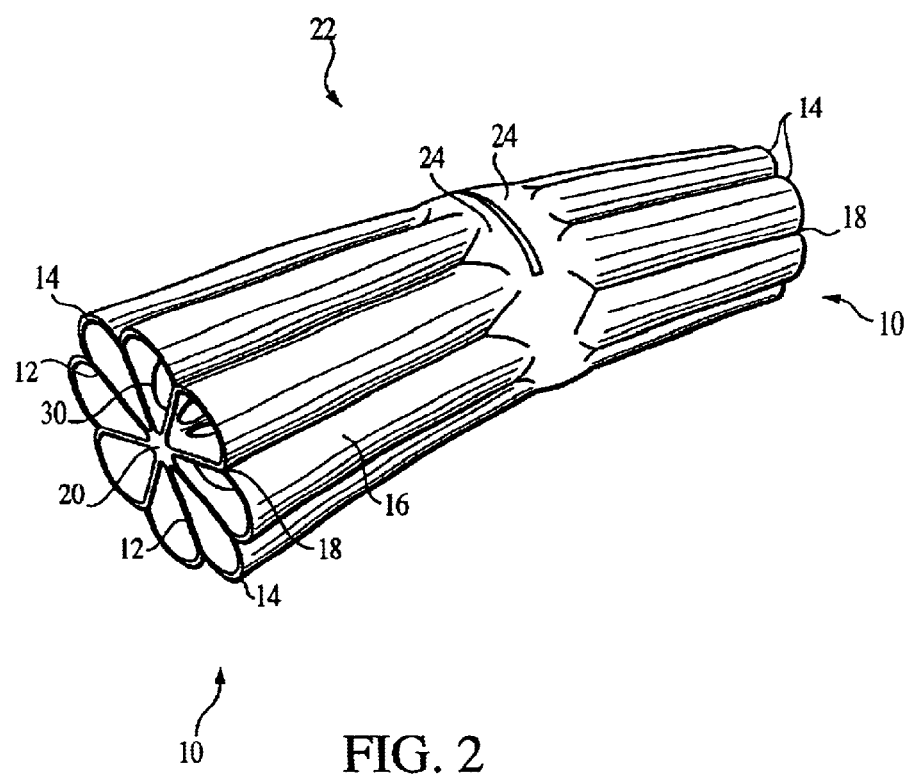
FIG. 2 is a perspective view of a pair of connected unitary structural members.

As shown in FIG. 1, and as more clearly seen in FIG. 2, for example, the outer surface defined by the arched outer portions may form a corrugated configuration, with furrows 18 that align with the plurality of web portions. The extent of the corrugation (furrow 18 depth) may be customized depending upon component-specific service conditions by varying the radial length of selected web portions 12 and the shape and/or thickness of selected outer portions.

In the embodiment shown in FIGS. 1 and 2, the web portions 12 extend from one another and from a substantially central (in cross-section) portion 20 at or near the intersection of the web portions 12. The central portion 20 itself extends axially along the member 10. The central portion 20 may, but not necessarily, be continuous along its axial direction. The axial direction defined by the central portion 10, preferably followed substantially in parallel by the remainder of the unitary structural member 10, including the web portions 12 and the outer portions 14, may be either lineal or curvilinear in trajectory. FIG. 2, for example, shows the member, including the central portion 20, extending axially along a curvilinear trajectory. The central portion 20 shown in FIG. 1 is substantially circular in cross-section, but in other embodiments, it may have a different cross-sectional shape. One skilled in the art will appreciate that, by selectively varying the axial trajectory of the central portion 20, web portions 12 and/or the outer portions 14, the overall trajectory of the unitary structural member 10 can be configured to meet particular structural needs. In the radial direction, the central portion 20 may be symmetrical, or asymmetrical, such as in a spline trajectory.

Figure 7:
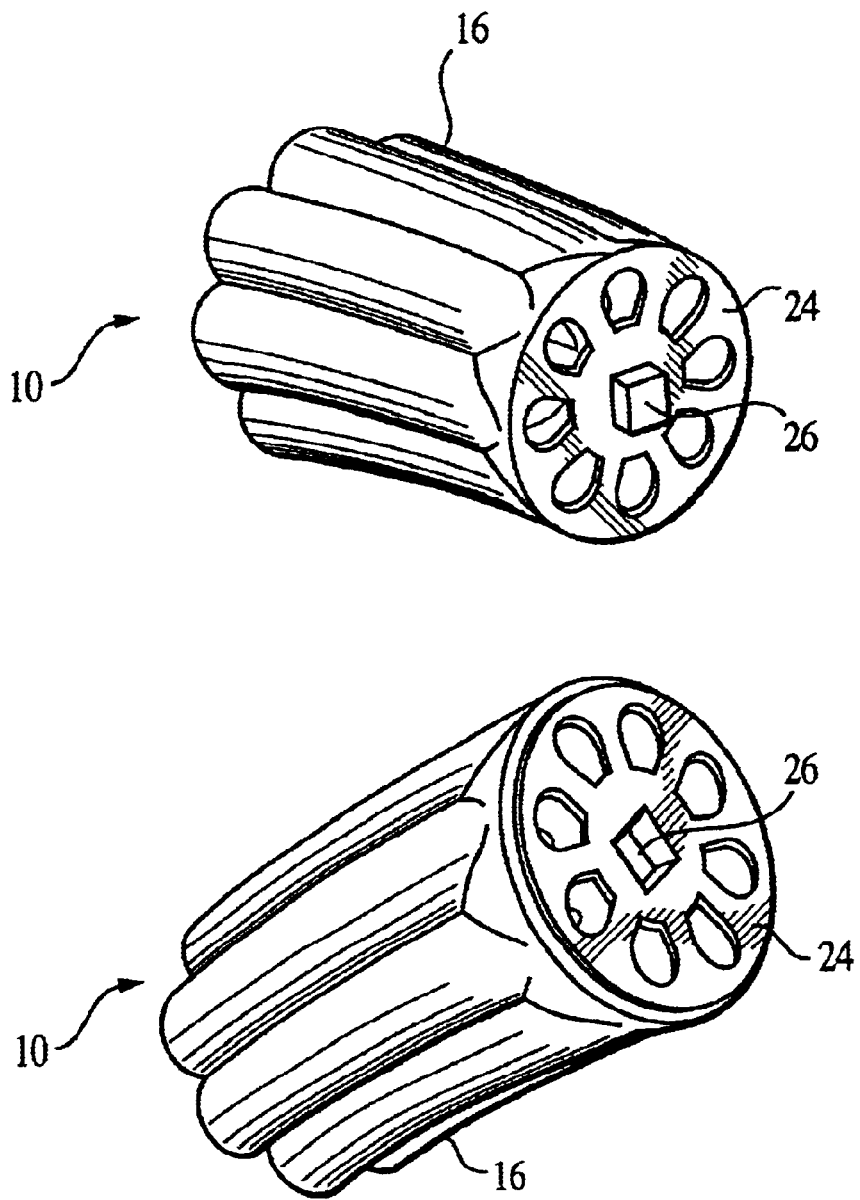
FIG. 7 is a perspective view of a pair of unitary structural members showing connecting structures.
Figure 8A:
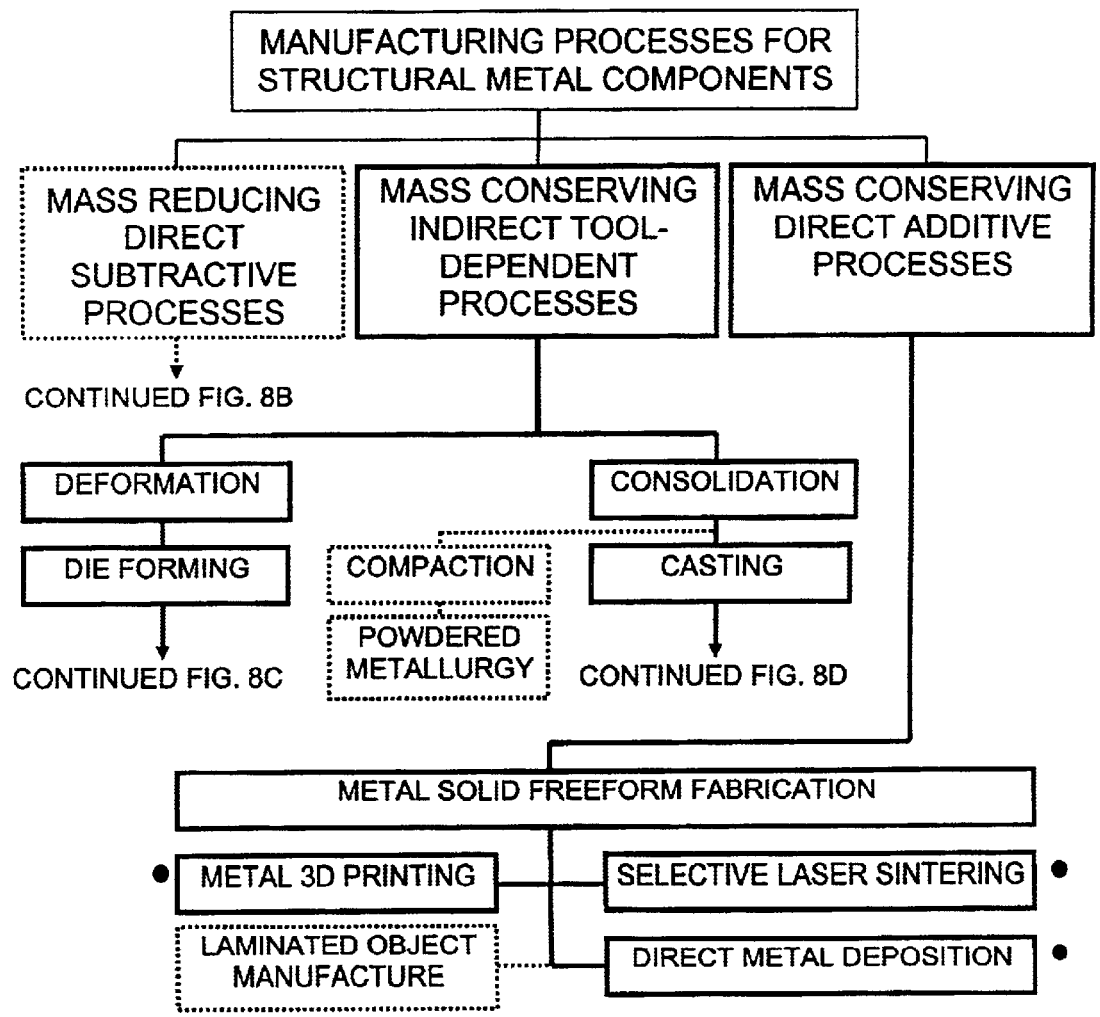
FIG. 8 is an analytical taxonomy of preferred types of processes for manufacturing complex shaped metal components.
Figure 8B:
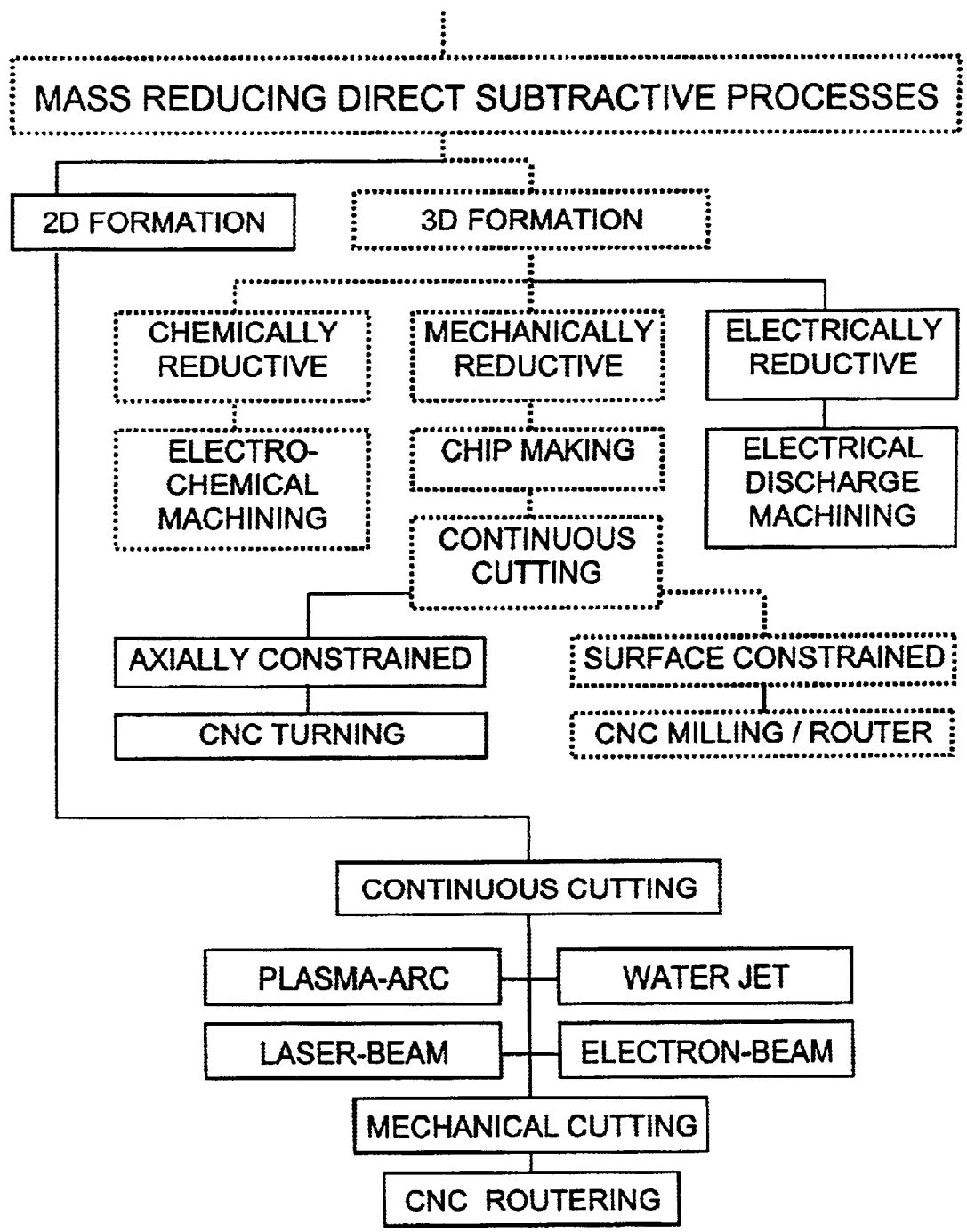
Figure 8C:
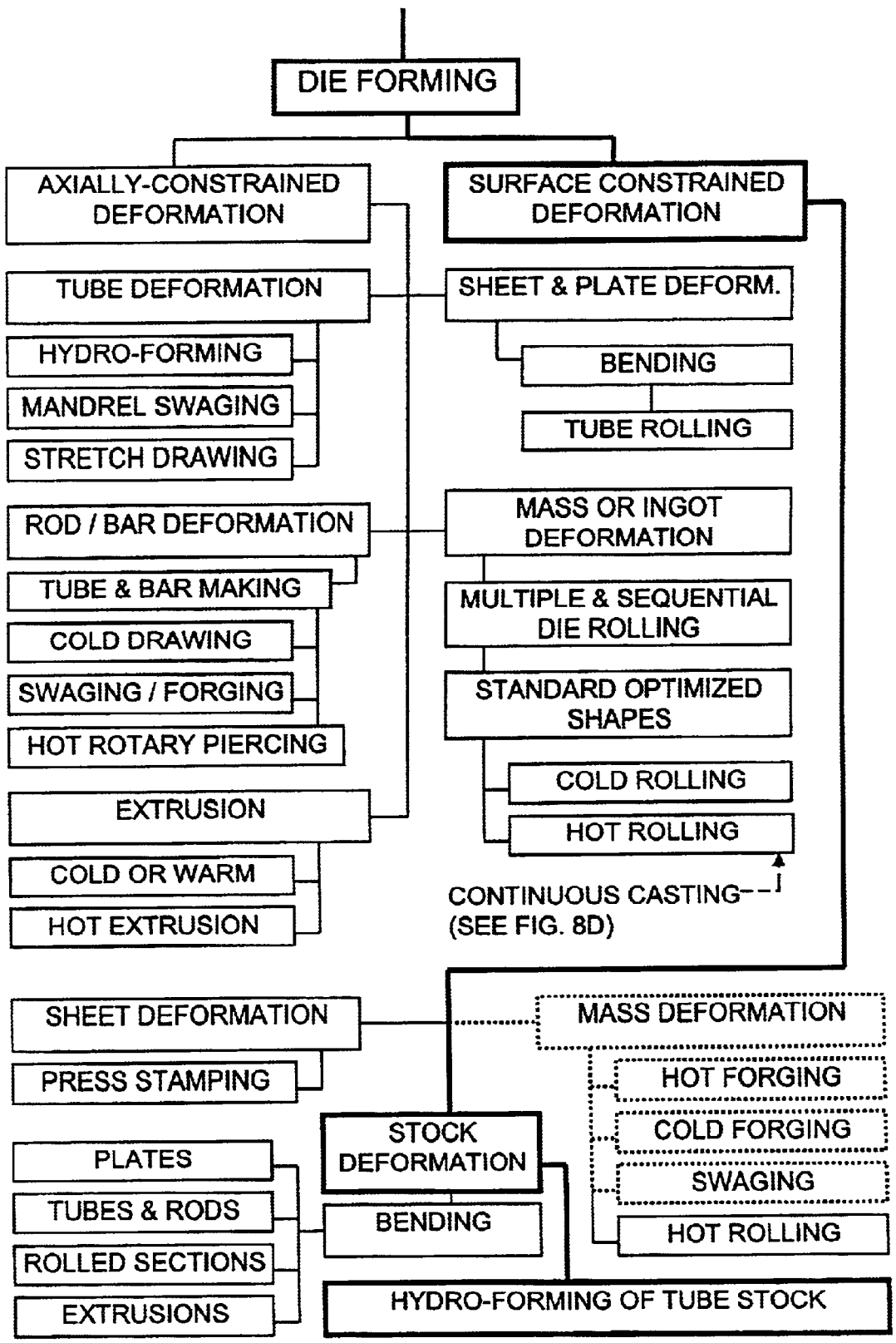
Figure 8D:
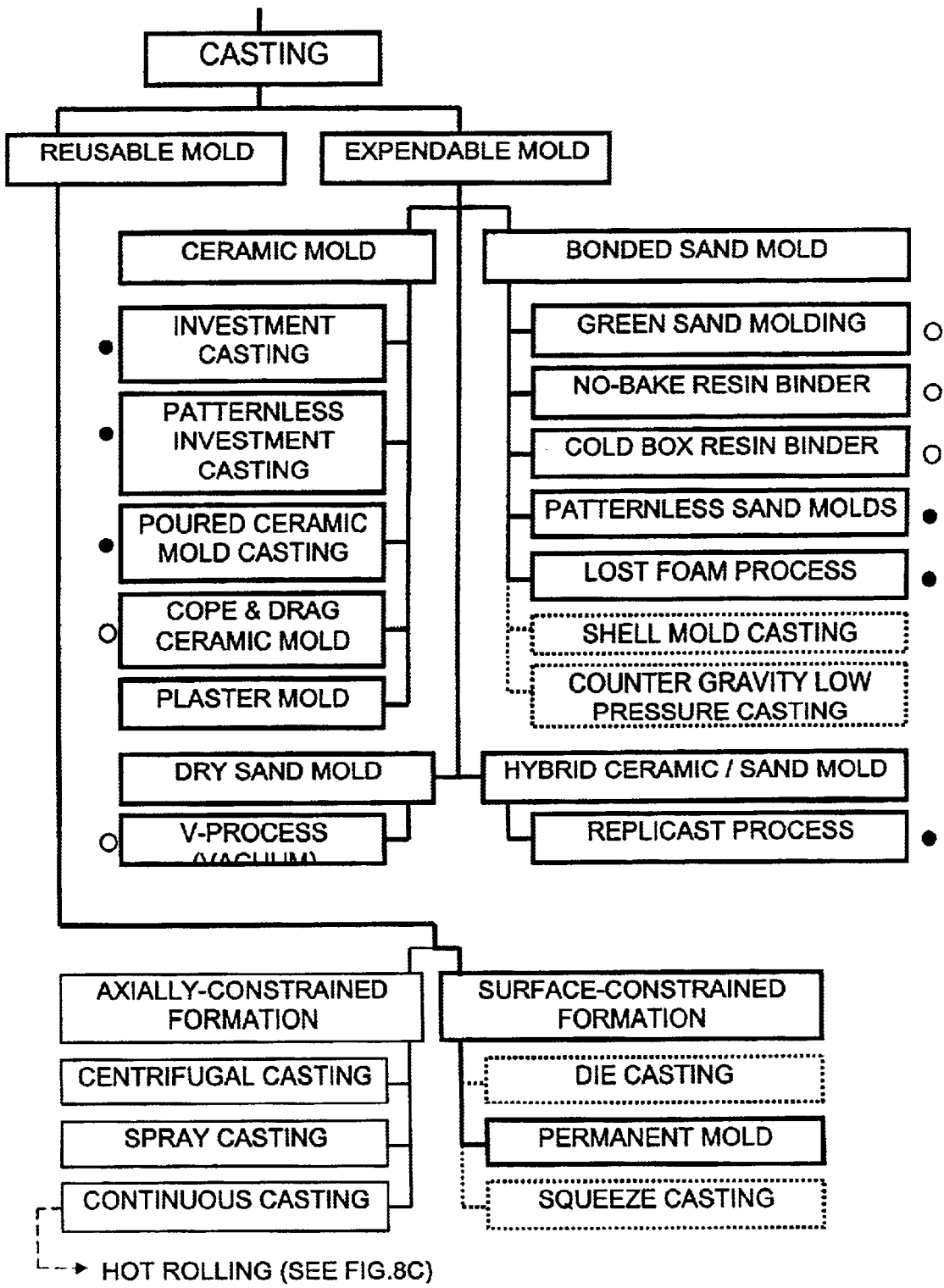

The (optional) central portion 20, the plurality of web portions 12, and the outer portions 14 are preferably integral portions of the unitary structural member 10. By "unitary", it is intended to mean that the unitary structural member 10 is formed in a single, integral piece; that is, the unitary structural member is not a fabrication of separate sections. However, individual unitary structural members 10 can themselves be sections of a larger combined structure 22, as shown in FIG. 2. In the arrangement shown in FIG. 2, a pair of unitary structural members 10 having a configuration similar to that shown in FIG. 1, are connected via mating connective structures 24, one of which is more clearly seen in FIG. 7. The connective structures 24 may be integrally formed on one or both ends of the unitary structural members 10. Preferably, the connective structures 24 include a self-registering connector 26; that is, a connector 26 configured to prevent relative rotation of connected members. The self-registering connector 26 may include a male or female connector, as shown in FIG. 7, a pin or other independent connection, or another type of connection. To combine a pair of the unitary structural members 10, the connective structures 24 are connected and preferably adhered, welded or bonded to form the combined structure 22.

As further shown in FIG. 1, a plurality of perforations 30 is formed within the plurality of web portions 12 to form perforated web portions. The perforations 30 are disposed and arranged to be axially aligned with the plurality of web portions 12. Though the perforations 30 are not required, the present inventor has discovered that perforated web portions 12 provide significant structural integrity with a high strength-to-weight ratio. The perforations 30 also provide additional ways to customize the unitary structural member 10 by varying, for example, the configuration and arrangement of the perforations.

Figure 3:
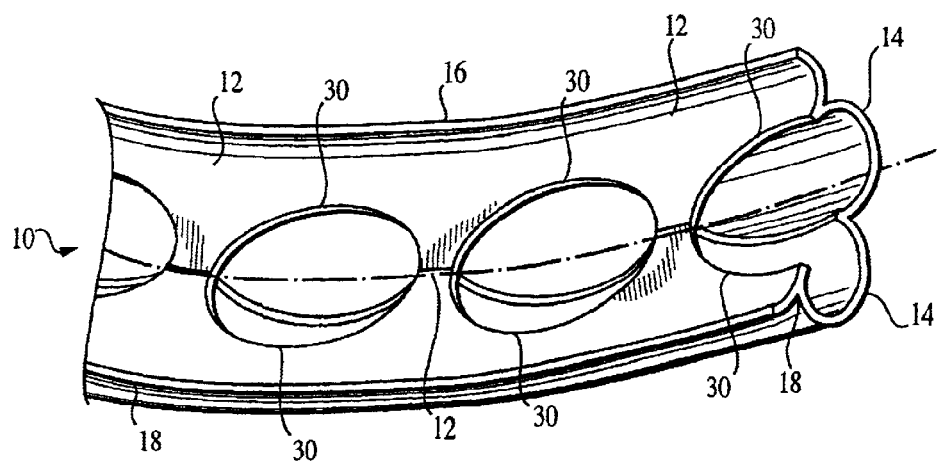
FIG. 3 is a cut away view of a unitary structural member according to another embodiment of the present invention.

As shown in FIG. 1, the perforations 30 may be relatively large and centrally located on the plurality of web portions 12, and may be disposed within the plurality of web portions radially symmetrically with respect to the central portion 20. The perforations 30 may also be radially disposed about an intersection of the web portions 12, as shown in FIG. 3. In this way, the perforated web portions 12 are conceptually similar to internal surface ribs that intermittently bridge to their opposing counterparts via the center of a particular cross-section. If such perforations 30 are part of web portions 12 that extend from the central portion 20, the perforations create discontinuity of the central portion at their location. The perforations 30 preferably are axially disposed within the plurality of web portions 12 along their respective axes. In this way, it will be appreciated that, as is apparent in FIG. 1, cross-sections of the unitary structural member 10 will vary at least in shape along particular axial positions along the unitary structural member. For at least this reason, it is also to be understood that, by describing that the plurality of web portions 12 "axially extend" along the unitary structural member 10, the cross-sections may vary in shape and/or size along the various axial portions of the unitary structural member, though the member may otherwise be of substantially uniform cross-sectional size and shape.

The external surfaces 16, whether corrugated, smooth, or otherwise, may also include perforations (not shown) in order to further optimize strength-to-weight ratios. The use of external perforations may also be dependent on anticipated service conditions. Alternatively, the outer surface 16 may be relatively continuous and/or smooth in profile.

The wall thickness of the central portion 20, plurality of web portions 12, and/or the plurality of outer portions 14 may be either constant or variable depending on, for example, manufacturing process requirements and the extent to which the strength-to-weight ratio is optimized. For example, to provide a relatively smooth, cylindrical outer surface 16 with the arched outer portions 14, as shown in FIG. 5D, a designer may selectively increase the wall thickness of the outer portions to fill in the furrows 18.

It is an important aspect of the present invention that, among other things, the cross-sectional size and/or shape, wall thickness, axial trajectory, component material, and/or arrangement of the unitary structural member 10, including the perforations 30, can substantially vary as a result of varying the radial size or shape or the trajectory of the central portion 20, plurality of web portions 12, or plurality of outer portions 14, or selected ones of these portions, throughout the member, or at axial positions along the member. The variances contemplated may be present between particular unitary structural members 10, or within one of the unitary structural members. By selectively varying one or more of these parameters in the design of the member 10, unique unitary structural members 10 may be formed that are optimized for specific use environments. The unitary structural members may vary in, for example, cross-sectional size or shape, trajectory shape, or number of web portions 12.

By varying size and/or shape of one or more of the plurality of web portions 12, the cross-sectional size and shape of the unitary structural member 10 varies accordingly. The unitary structural members 10 may thus be designed to have optimum sizes, cross-sectional shapes, or strengths at particular axial positions to meet particular service conditions. For example, variable service requirements along the unitary structural member 10 length may result in optimizations in terms of size, shape, strength, and/or material usage.

Figure 4D:
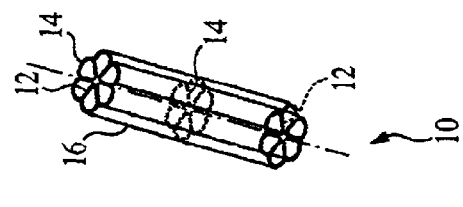
FIGS. 4A–4D are simplified drawings of unitary structural members varying in web portion radial length and/or trajectory.
Figure 4C:
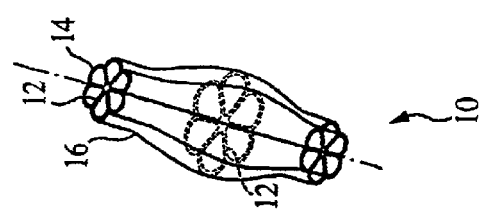
Figure 4B:
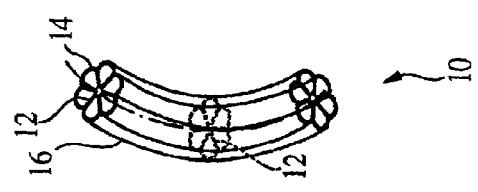
Figure 4A:
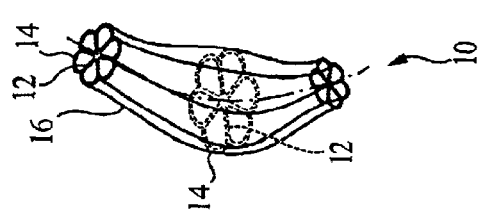

FIGS. 4A–6D are illustrative examples of embodiments of the unitary structural member 10, showing effects of varying one or more of the above-described parameters on embodiments of the unitary structural member. FIGS. 4A–4D illustrate the effect of variations in the radial length of the plurality of web portions 12 and/or the trajectory of the central portion 20 (and thus the unitary structural member 10). In FIG. 4A, the radial length of the plurality of web portions 12 varies along axial positions of the unitary structural member 10, increasing near the axial middle of the member, and decreasing near the ends. The plurality of outer portions 14 vary in arc length accordingly to extend between the plurality of web portions 12, so that the unitary structural member 10 maintains a cross-sectional shape that is substantially similar in proportion. The axial location of maximum cross-sectional size may be designated to meet particular service conditions. The axial trajectory of the unitary structural member 10 in FIG. 4A is curvilinear.

By keeping the radial length of the plurality of web portions 12 relatively constant while maintaining the curvilinear trajectory of the central portion 20, the unitary structural member 10 shown in FIG. 4B can be produced. FIGS. 4C and 4D show the effect of altering the design of FIGS. 4A and 4B, respectively, by providing a straight trajectory for the central portion 20.

FIGS. 5A–5D illustrate an effect of varying the number of web portions 12, where the plurality of web portions and the arched outer portions are disposed about the central portion 20 in generally equal intervals. FIGS. 5A, 5B, and 5C include three, four, and five web portions 12, respectively. The arched outer portions span between the plurality of web portions 12, forming corrugations in the outer surface 16 of the unitary structural members 10. It will be apparent that as the number of symmetrical web portions 12 increases, the outer surface 16 may become more circular in cross-section. FIG. 4D includes eight web portions 12, and the wall thickness of the web portions 14 and/or the arched outer portions are increased at the circumferential position of the outer portions. This design, as described above, may result in a smooth, continuous outer surface 16, as shown.

FIGS. 6A–6D illustrate an effect of varying the number, length, and/or direction of the plurality of web portions 12, and also varying the shape of the outer portions 14 spanning the web portions. FIG. 6A shows six web portions 12 that are disposed unequally about the cross-sectional profile of the unitary structural member 10. The arched outer portions 14 span to connect the web portions 12. In FIG. 6B, seven web portions 12 are shown, and the outer portions 14 vary. Some outer portions 14 are arched, and have a greater wall thickness at the web portions 12 to provide a smooth outer surface 16. Other outer portions 14, however, are not arched, but are straight, providing a rectilinear side to the unitary structural member 10. The web portion 12 extends beyond the outer portion 14 disposed over it to create a T-shape profile 32 at the top (as shown) of the unitary structural member 10. FIGS. 6C and 6D show variations of the unitary structural member 10 of FIG. 6B, having five and three cavities, respectively, without a web portion 12 extending beyond the outer portions 14.

FIG. 3 additionally illustrates one example of the central portion 20 being generally curvilinear in cross-section, as opposed to a substantially cylindrical central portion 20 shown in other embodiments.

The perforations 30 within the plurality of web portions 12 may be disposed symmetrically about the central portion 20, as shown in FIG. 1, or additionally or alternatively may be centered on the plurality of web portions 12 as shown in FIG. 3, and as described above. In either approach, the size and quantity of the perforations 30 may vary with cross-sectional dimensions and service conditions. For example, the perforations 30 may be smaller and/or more numerous.

To manufacture the unitary structural member 10 of the present invention, particularly types of embodiments that include perforations 30, a number of methods are disclosed and described below. The description below, however, is not intended to limit the particular scope of manufacturing methods contemplated for the unitary structural member 10.

FIG. 8 is an analytical taxonomy of preferred types of processes for manufacturing the metal unitary structural member 10 of the present invention. As described in the legend of FIG. 8, those manufacturing processes with a capacity to produce the metal unitary structural member 10 are highlighted in gray and with a black dot.

Figure 9:
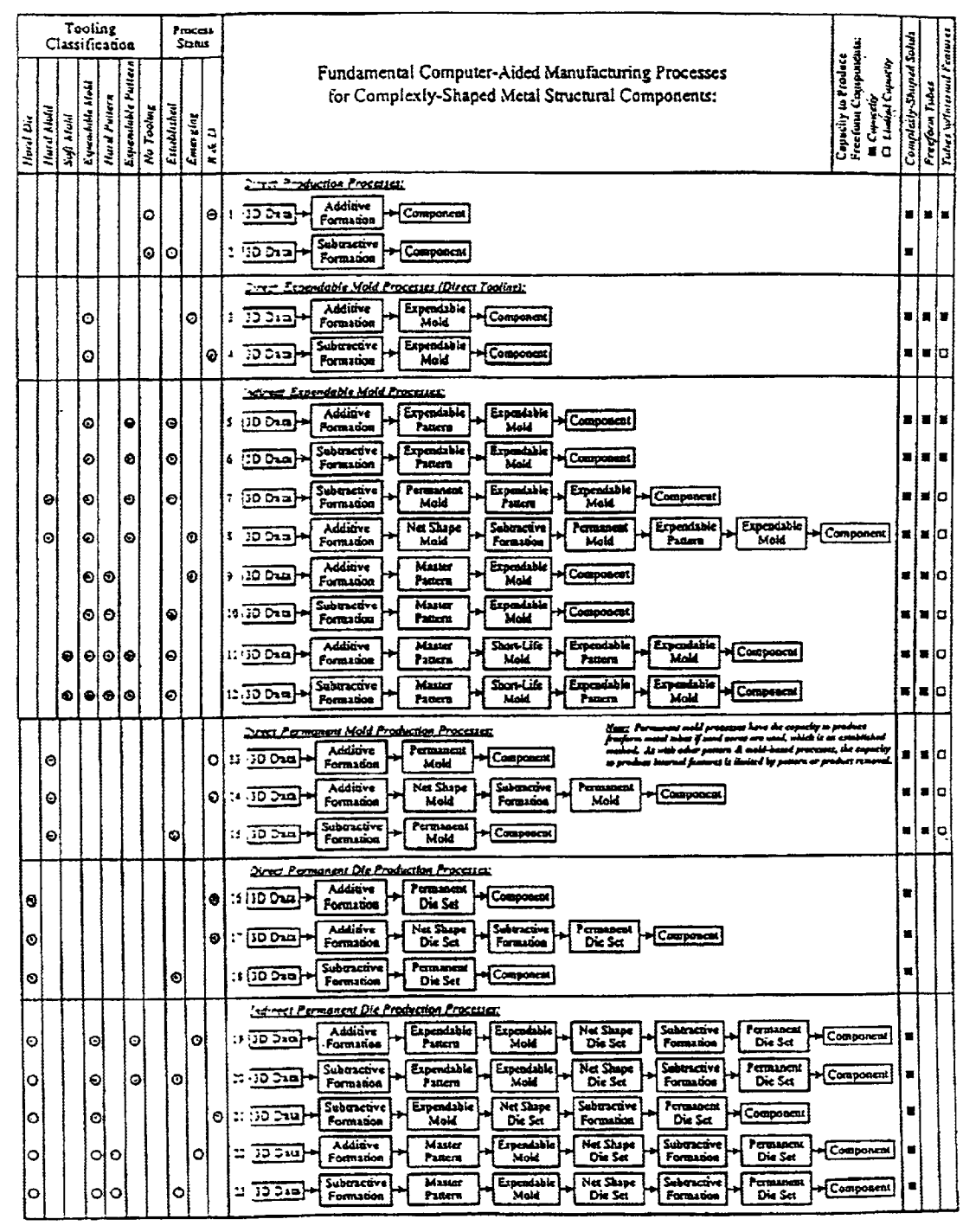

There are two preferred general categories of manufacturing processes for producing the metal unitary structural member 10 of the invention. The metal unitary structural member 10 can be manufactured indirectly using various types of investment (ceramic mold) casting. The invention can also be made directly or indirectly using additive metal forming technologies. All preferred methods of manufacturing the metal unitary structural member 10, however, typically require three-dimensional data obtained from digital solid models of the invention. These production processes are, therefore, what are generally termed computer-aided manufacturing (CAM) processes. A summary of preferred fundamental CAM processes for making the metal unitary structural member 10 is presented in FIG. 9. Those fundamental manufacturing processes with the capacity to produce the unitary structural member 10 with internal features are highlighted with a black square in the column to the far right in FIG. 9.

The metal unitary structural member 10 having perforated web portions 12 can be investment cast in most alloys from additively or subtractively formed expendable patterns. Additively formed patterns are made from digital data using commercially-available computer numerically controlled (CNC) layer-based solid freeform fabrication technologies and materials suitable for combustion or melting. Subtractively-formed patterns are made from digital data using commercially-available multi-axis CNC milling machines or routers. Depending on the required size of the metal unitary structural member 10, it will often be necessary to subdivide the member into segments that can fit within the build chamber of a solid freeform fabrication device. These segments can be made to self-register with the correct orientation and then simply glued together as shown in FIG. 2. Patterns made using subtractive methods will have to be subdivided to accommodate otherwise inaccessible internal features (i.e. internal perforated webs will necessarily be discreet CNC milling operations). The resulting self-registering subtractively formed pattern components are then assembled into a complete pattern.

In order to make the metal unitary structural member 10 having perforated web portions 12, it is preferred first to create a digital representation of it in a parametric solid modeling program that can accommodate and facilitate the generation of complex geometry. Examples of such software include Pro/Engineer® by Parametric Technology Corporation, Unigraphics Solutions® by EDS, and Catia® by Dessault Systemes. It is also preferred to use such software because it can accommodate the digital assembly of subcomponents and/or the subdivision of large components into segments small enough to fit in the build chamber of a particular additive manufacturing process.

Once a particular metal unitary structural member 10 has been digitally modeled, the model is then either directly or indirectly (via data exchange in a neutral format such as IGES) imported into finite element analysis software and evaluated per the anticipated structural service conditions. Specific material properties will then be applied to the model prior to analysis, and this analysis will further inform and refine the optimization of the component in terms of its strength-to-weight ratio. In other words, material usage in terms of wall thickness, web 30 thickness, and the size and configuration of perforations 30 will be digitally optimized relative to the required strength (plus a safety factor). In most cases, it is likely that a variety of the perforations 30 for the web portions 12 will be digitally modeled in advance of analysis, along with a varying quantity of the web portions. This will make it possible for the analytical results of several potentially optimal configurations to be compared and assessed. It is most likely that the various web portion 12 and perforation 30 configurations would exist in the same digital model as either parametric variables or sets of geometric features that can be turned on and/or off prior to the exportation of data. Digital structural analysis will also highlight areas of critical stress where there is insufficient material as well as situations where there is excess material that might be removed from the model if it is not required for manufacturing reasons.

In addition to structural optimization analysis, if the metal unitary structural member 10 is to be manufactured indirectly using an investment casting process, data from its digital model will usually be exported to a manufacturing analysis program that will assist in evaluating castability. Casting analysis programs (e.g. MAGMASoft®) are used to predict the flow of molten metal and the solidification process and are therefore are able to anticipate likely casting defects. In some cases, the extent to which the metal unitary structural member 10 can be optimized will be slightly constrained by the need to accommodate casting requirements such as directional solidification (ferrous alloys) and thorough distribution of molten metal in the ceramic mold.

Once the results of structural and manufacturing analyses have been incorporated into the computer model for the metal unitary structural member 10, and once the member has been segmented or subdivided as necessary to accommodate a particular pattern manufacturing technology, the data defining surface geometry is exported in an appropriate format, typically in a neutral file format. This data is then imported into computer-aided manufacturing (CAM) software. If pattern components are to be made using a subtractive process, the computer code that will direct the automatic carving of these pattern components out of blocks of material using a CNC milling machine will be generated using a CAM program such as MasterCAM® or SurfCAM®. If pattern components are to be manufactured using an additive material forming process, then the geometric data will be imported into the proprietary CAM software provided by manufacturers of commercial solid freeform fabrication devices. All CAM programs for additive material forming, however, provide the means to orient the component as desired and then subdivide it using a slicing algorithm into very thin horizontal layers of a specified thickness. The layer thickness selected will determine the dimensional accuracy of complex surfaces. Thinner layers result in superior resolution and accuracy, whereas thicker layers will result in a faster build rate.

The metal unitary structural member 10 having perforated web portions 12 can be investment cast from expendable patterns made using a variety of commercially-available layer-based solid freeform fabrication (SFF) technologies. In general, SFF technologies that utilize powdered material are the most suitable for making expendable patterns for investment casting the unitary structural members. This is because these SFF technologies use the surrounding bed of powdered material to temporarily support the pattern during the build process, and because powder supporting the freeform tubular pattern's interior can be easily removed with gravity and air flow. SFF technologies that require and generate insoluble support structures for overhanging features are less suited to the manufacture of the metal unitary structural member 10 because of the difficulty and necessity of removing these internal temporary support structures prior to investment casting.

Three-dimensional printing (3DP) and selective laser sintering (SLS) are the two major powder-based SFF technologies. Three-dimensional printing technology uses a standard ink-jet print head to deposit a water-based liquid binder onto a starch (cellulose) powder. This binder is deposited in an area corresponding to a thin horizontal cross-section of the model. The build chamber is then lowered per the specified layer thickness, and a roller spreads another layer of powder before the next section is printed. This process is repeated layer by layer until the pattern is finished, at which time it is then removed from the build chamber, dried and infiltrated with wax or resin. 3D printed patterns can be easily sanded and coated as required for investment casting, and they combust without leaving significant residual ash in the ceramic mold. One type of commercial 3DP devices that can produce combustible patterns investment casting is manufactured by Z Corporation and marketed as concept modelers because it has a relatively fast build rate and slightly less precision than many other commercially available SFF technologies. For many applications of the metal unitary structural member 10, however, the accuracy of the process is suitable or can be circumvented by CNC machining connective interfaces between members.

Selective laser sintering technology was developed at the University of Texas and commercialized by DTM Corporation in Austin. EOS Gbmh in Germany also developed SLS and both companies manufacture their own range of machines. SLS is very versatile and can process a variety of materials including polymer powders, sand, and metal powders. SLS uses laser heat to raise the temperature of powdered polymers (or the binder that coats grains of sand or metal) to the point where individual grains fuse together. As with 3DP, SLS parts are supported by surrounding powder while being built layer by layer. Both DTM Corporation and EOS Gbmh produce materials designed for use in foundries. SLS produces very dimensionally accurate expendable patterns.

Exceptionally accurate wax patterns for casting very small metal unitary structural members 10 having perforated web portions 12 can be made using the ModelMaker™ liquid-to-solid inkjet printers manufactured by Sanders Prototype, Inc. While this technology automatically generates temporary support structures for overhanging features, these supports are built out of a different material that can be dissolved with a solvent that will not damage the pattern per se. In other words, the support structures for the perforated web portions 12 can be removed even though they are physically inaccessible.

Fused deposition modeling (FDM) is a SFF technology that uses a computer controlled extrusion head to incrementally deposit layers of melted thermoplastic materials. FDM machines are manufactured by Stratasys® Inc. and the company produces a wax material designed for use in making expendable patterns. Like the other thermoplastic materials available for FDM, this foundry wax solidifies immediately after being deposited. Water soluble temporary support materials for FDM have been developed for use with ABS, but liquid-based support structure removal is not currently available for the foundry wax used with FDM. This means that FDM is significantly less useful for making patterns for casting the metal unitary structural member 10 having perforated web portions 12.

While very accurate, stereolithography is another SFF technology that generates temporary internal support structures that are problematic for making the metal unitary structural member 10 having perforated web portions 12. Stereolithography machines are manufactured by 3D Systems and their build chamber is a vat of ultraviolet-sensitive liquid polymer. The application of laser light solidifies the liquid polymer layer by layer from the bottom up until a component is completely built. In order to use this technology to create expendable patterns, proprietary QuickCast™ software currently must be used. This software generates a honeycomb structure within the wall thickness of a pattern, and this internal configuration enables the pattern to collapse inward during combustion without applying destructive forces to the ceramic mold. QuickCast™ patterns have been used successfully commercially, but they can be problematic, and extensive foundry experience is generally required to assure a reasonable likelihood of success. The difficulty of using stereolithography to create expendable patterns combined with the likely impossibility of being able to remove temporary internal support structures render the technology a distinctly less useful means of manufacturing patterns for making the metal unitary structural member 10 having perforated web portions 12.

Multi-jet modeling (MJM) is a SFF technology developed by 3D Systems to quickly produce concept models and to build expendable patterns out of a wax material. MJM is commercially marketed as the Thermojet™ solid object printer. This process, however, also generates temporary support structures for overhanging features, and these have to be manually removed (i.e. water-based solutions or solvents are not available to dissolve inaccessible temporary supports), rendering MJM distinctly less useful for creating patterns for making the metal unitary structural member 10 having perforated web portions 12.

Investment casting is the most common and precise of the expendable ceramic mold metal casting processes, and the term is often used to generically refer to all expendable ceramic mold techniques. Other casting processes that use ceramic molds can also be used to indirectly manufacture the metal unitary structural member 10, and they are similar enough to investment casting to be covered by the process description below. These other processes include those utilizing a flask into which a ceramic slurry is poured, and those that support a ceramic mold with compacted sand, namely the Replicast® process, and lost foam metal casting.

An investment casting mold is created by investing an expendable pattern with a refractory shell by successively dipping it ceramic slurry, coating it with stucco, and air-drying these materials in a controlled atmosphere. The slurries are a carefully engineered blend of fine silica, binders, water and other ingredients that impart desired properties to the mold. There are typically at least three separate slurry mixtures for initial, intermediate and final coats. A variety of engineered stucco mixtures are also typically used. Drying time is a very significant portion of the total production time for an investment casting. Once a shell with the desired thickness is has been created, the pattern is burned or melted out in an oven, leaving only the ceramic mold. This ceramic mold is then fired again to a temperature appropriate for the alloy being cast. Solidification tends to begin fracturing the mold, which is intentional and desirable. If the ceramic shell is too thick and has too much strength, it will resist contraction forces in the cooling metal and cause tears in the casting. After solidification, the ceramic mold is completely removed. Gates, risers and other features required by the production process are then cut off and their point of connection with the part per se ground smooth.

Figure 10:
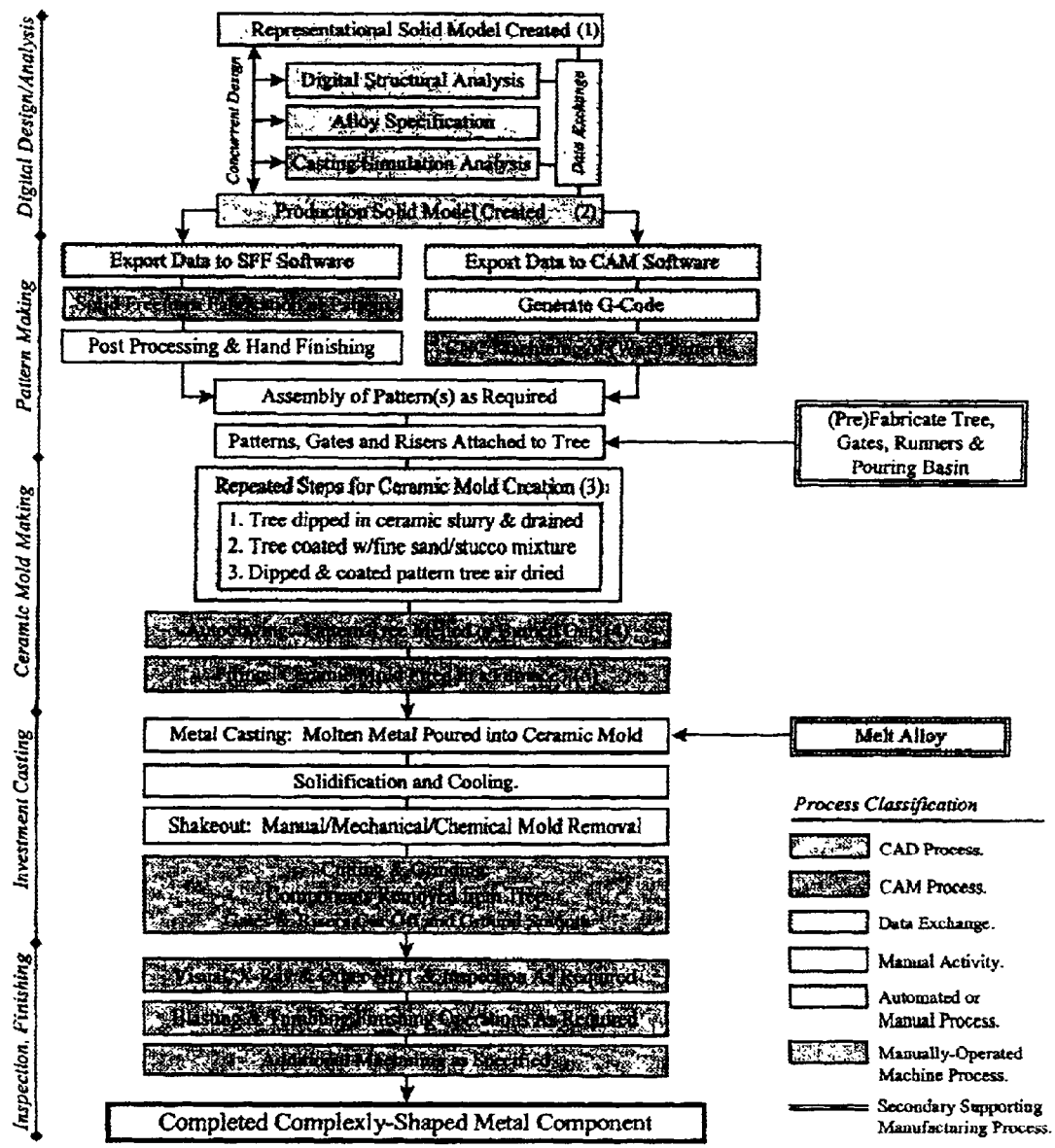
FIG. 10 is a chart showing steps in an investment casting process for forming a unitary structural member of the invention.

Investment cast metal unitary structural members 10 will generally exhibit excellent dimensional and surface accuracy, and will typically undergo various heat treatments to maximize their strength. Long metal unitary structural members 10 having perforated web portions 12 will often be cast in self-registering sections, as described previously, and then welded together, in which case heat treatments will be applied after the required operations. Generally, the unitary structural members 10 can be cast in lengths up to 60 or 72 inches, but ceramic mold processes have been used to cast much longer components, in some cases up to twelve feet. In these cases, a hybrid process using compacted sand to support a ceramic mold has typically been used. The size constraint in most foundries is the autoclave used to combust the invested pattern. The investment casting process is described in detail in FIG. 10 and is also illustrated below in the description showing a prototypical example of indirectly manufacturing the metal unitary structural member 10.

Figure 11:
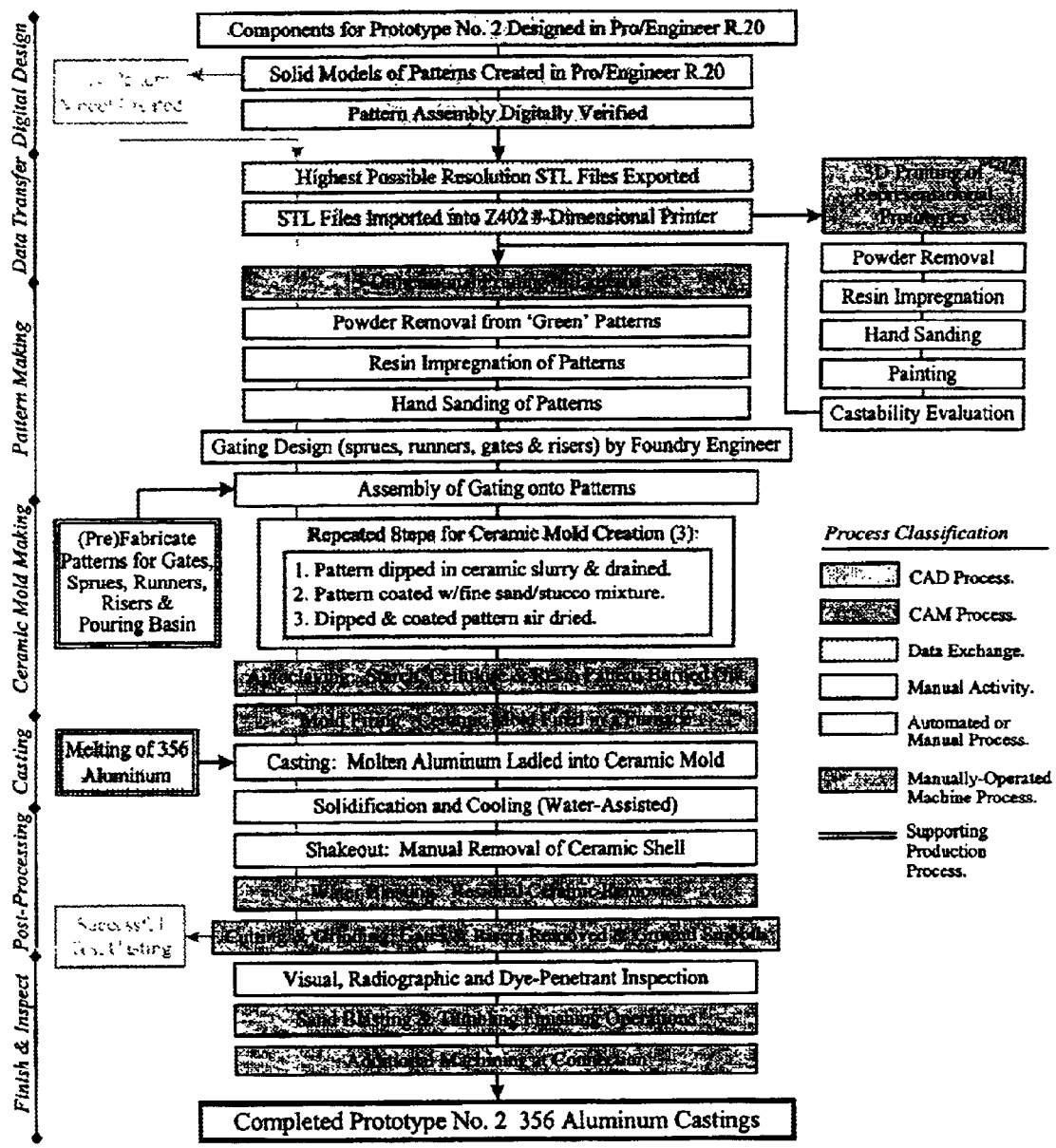
FIG. 11 is a chart summarizing steps in an investment casting process for manufacturing a prototype unitary structural member.
Figure 12:
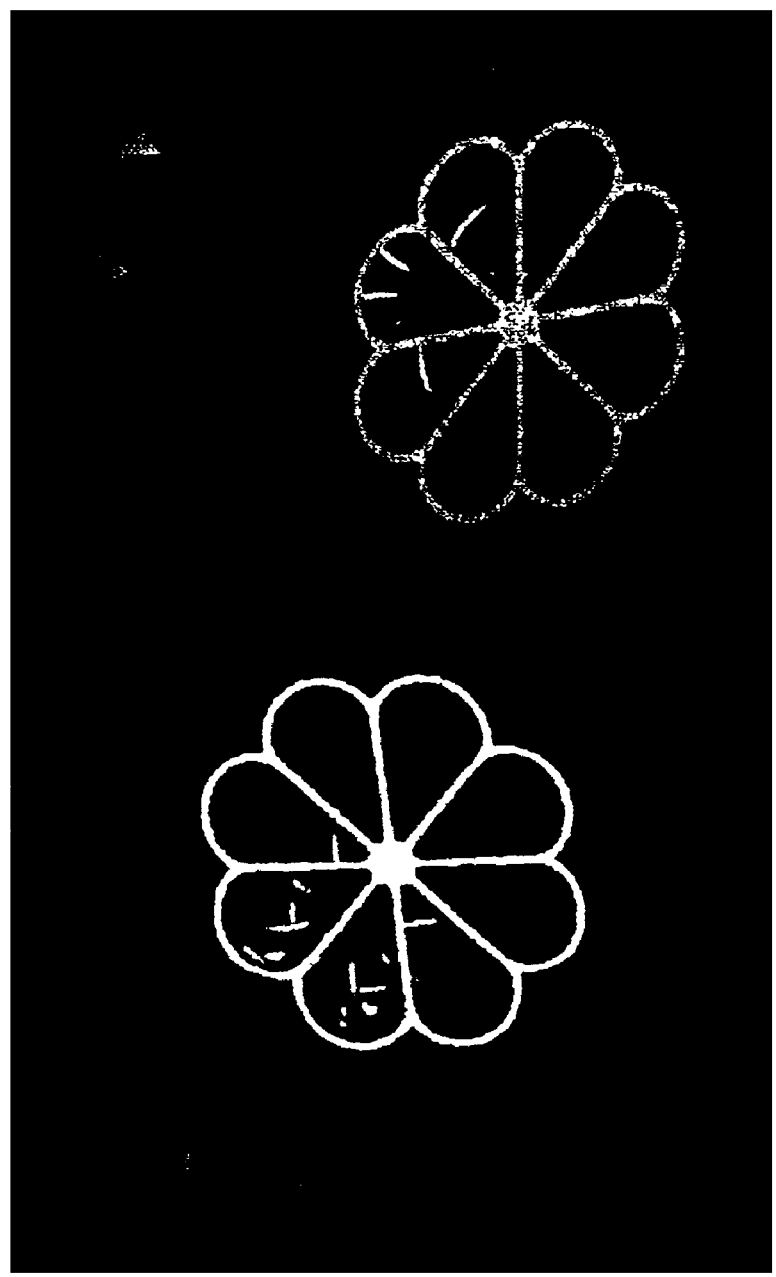
FIG. 12 is a screen capture of computer models of pattern components for an example embodiment of a unitary structural member.
Figure 13A:
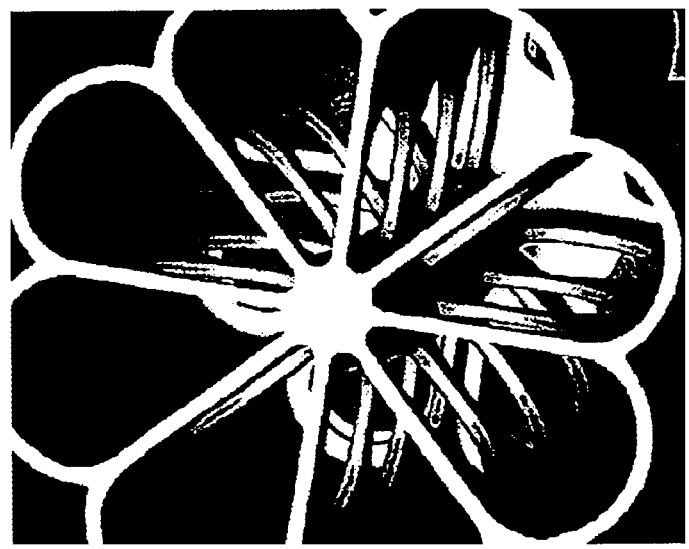
FIGS. 13A–13B are screen captures showing the internal structure of the unitary structural member.
Figure 13B:
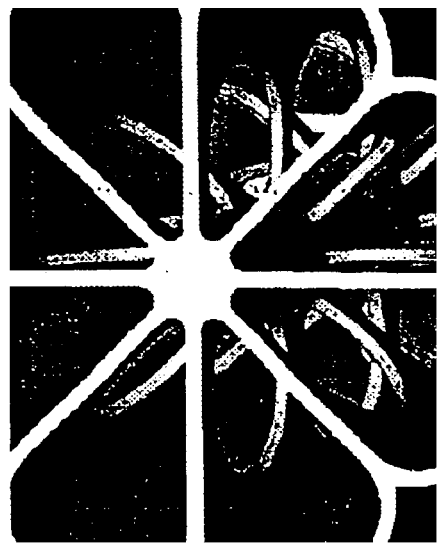

An illustrative example of an investment casting method for manufacturing the metal unitary structural member 10 having perforated web portions 12 will now be described according to one type of method to manufacture the present invention. The production process for manufacturing the metal unitary structural member 12 using investment casting is summarized in FIG. 11. Expendable patterns for this prototype were three-dimensionally printed using data exported from parametric computer models of the invention. These patterns were then invested with a ceramic shell and combusted. The resulting ceramic mold was used to cast this prototype in 356 aluminum, and these castings were then heated treated to maximize their strength.

Figure 14A:
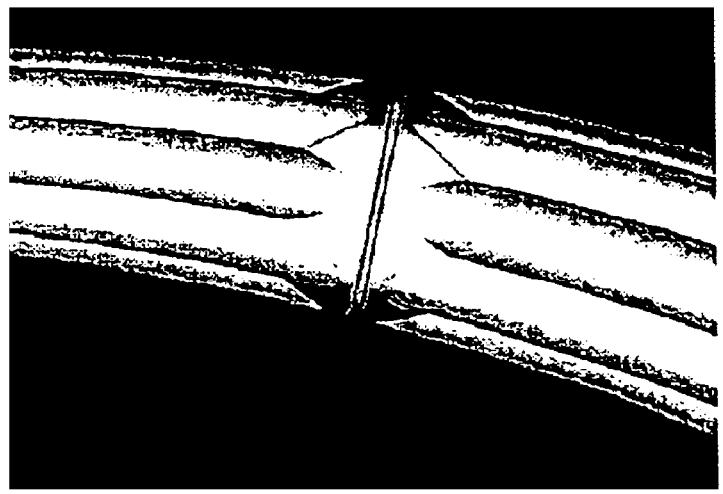
FIGS. 14A–14B show, in solid drawing, a digital assembly of a pair of unitary structural members.
Figure 14B:
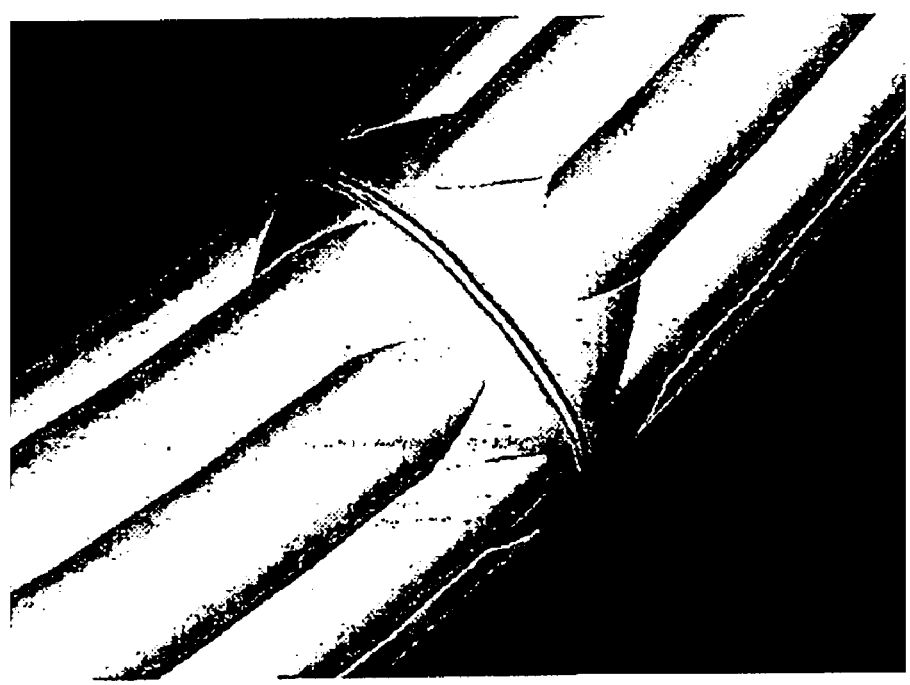
Figure 15:
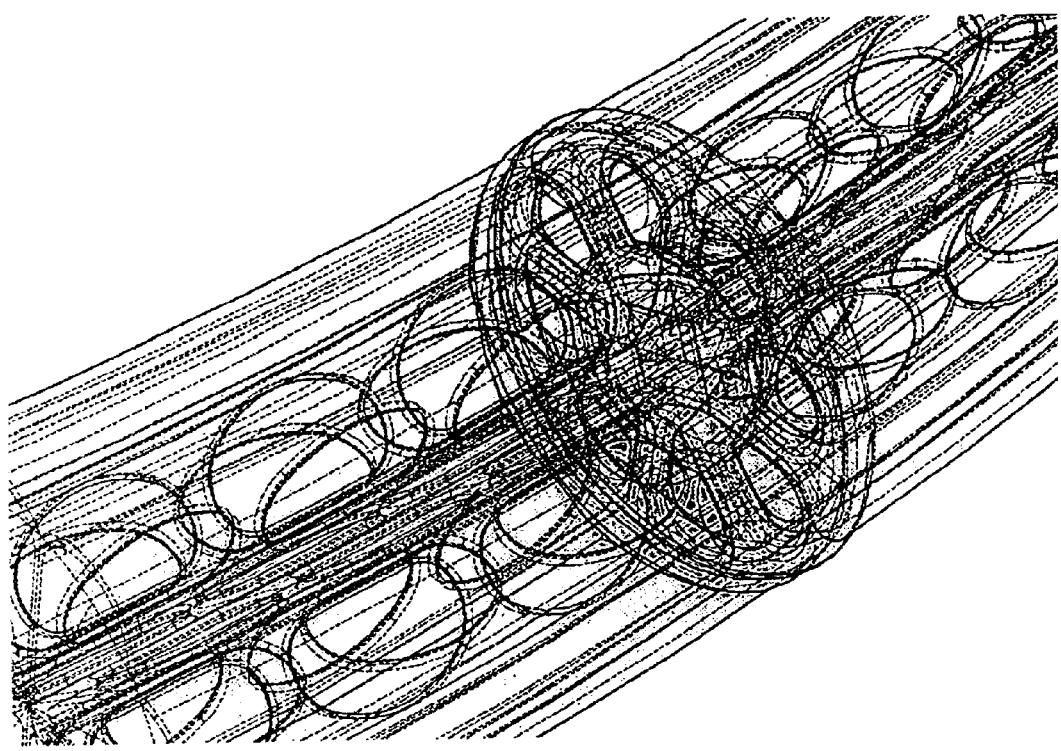
FIG. 15 shows a line drawing of a digital assembly of a pair of unitary structural members.

A portion of the metal unitary structural member 10 having perforated web portions 12 was designed using Pro/Engineer® parametric solid modeling software. The overall curvilinear length of this prototype is approximately two feet, and the circular area in which a cross-section of the member 10 can be inscribed ranges from approximately 5 inches in diameter to 3.5 inches in diameter, although the model can be easily parametrically modified so that these cross-sectional dimensions can vary greatly per service conditions and optimization analysis. The spline or curved trajectory of this particular member 10 lies in a plane, thereby making this tube symmetrical. The web portions 12, their perforations 30, the outer surface 14 (corrugated), and the openings at the connective structure 24 can also be parametrically modified in size and shape in order to facilitate shape and structural optimization. The connective structure 24 between what would otherwise be two 68-inch long members was incorporated into this prototype in order to evaluate and verify one possible design of such a connection. Images of the pattern component computer models are shown in FIGS. 12 and 13A–13C, and screen captures of digitally assembled patterns are shown in FIGS. 14A–14B and FIG. 15.

Figure 16A:
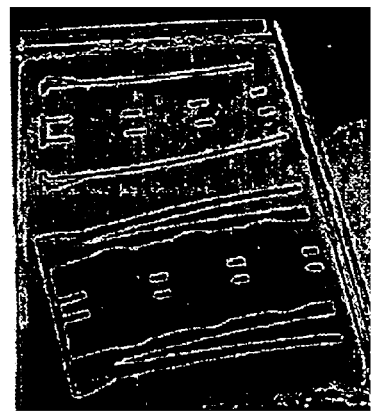
FIGS. 16A–16C show examples of three-dimensional printing of expendable patterns for manufacturing the unitary structural member.
Figure 16B:
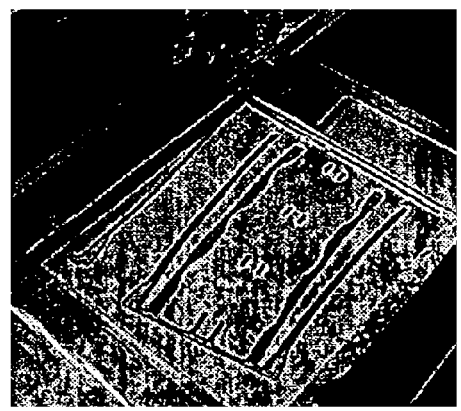
Figure 16C:
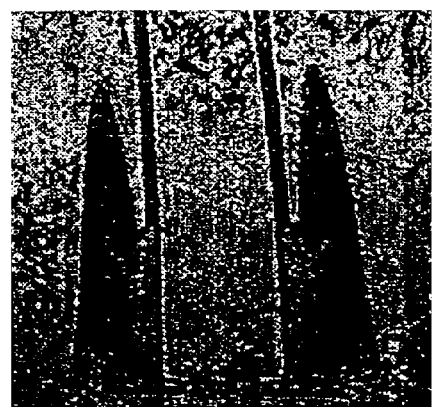
Figure 17A:
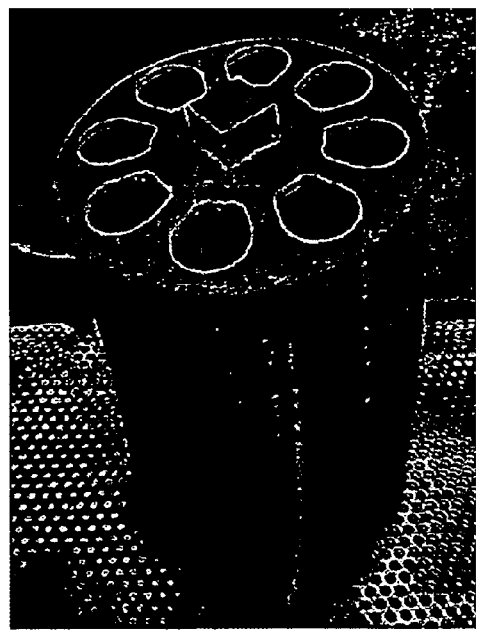
FIGS. 17A–17B show a pair of pattern components in a "green" state after powder removal.
Figure 17B:

As is shown in FIGS. 16A–16C, expendable patterns for the prototype metal unitary structural member 10 were three-dimensionally printed on a Z Corporation Z402 3D Printer. Two of these pattern components are shown in their "green" state after powder removal in FIGS. 17A–17B. Each pattern component was infiltrated with resin in order to obtain sufficient strength for handing and assembly in the foundry, as well as to facilitate further finishing of the external surfaces for aesthetic reasons.

Figure 18A:
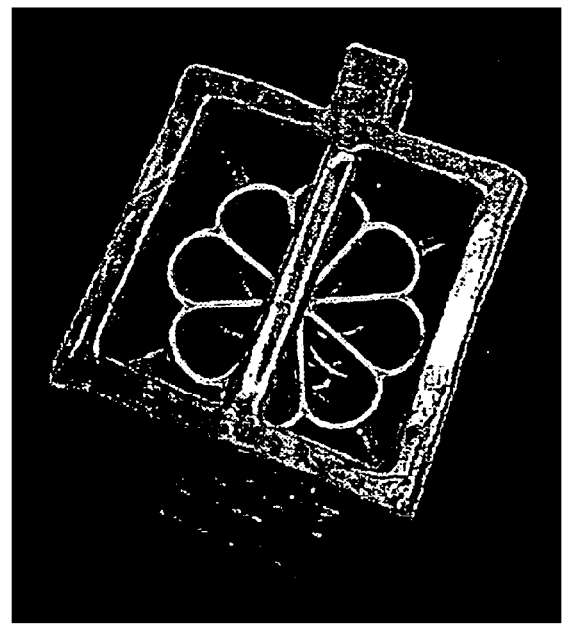
FIGS. 18A–18B show part patterns for producing a unitary structural member, with gating attached.
Figure 18B:
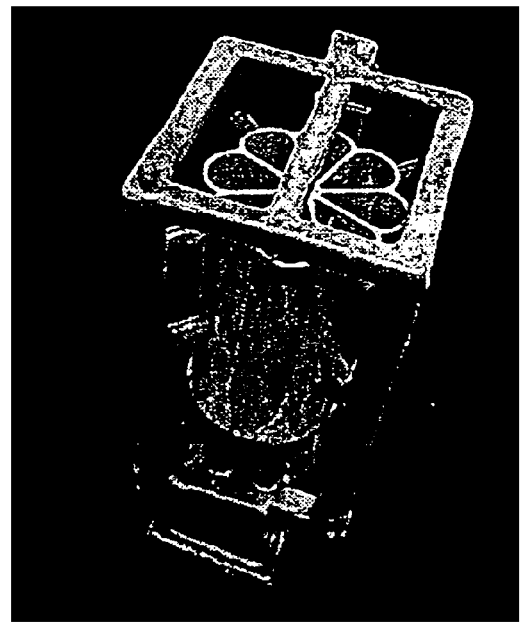
Figure 19:
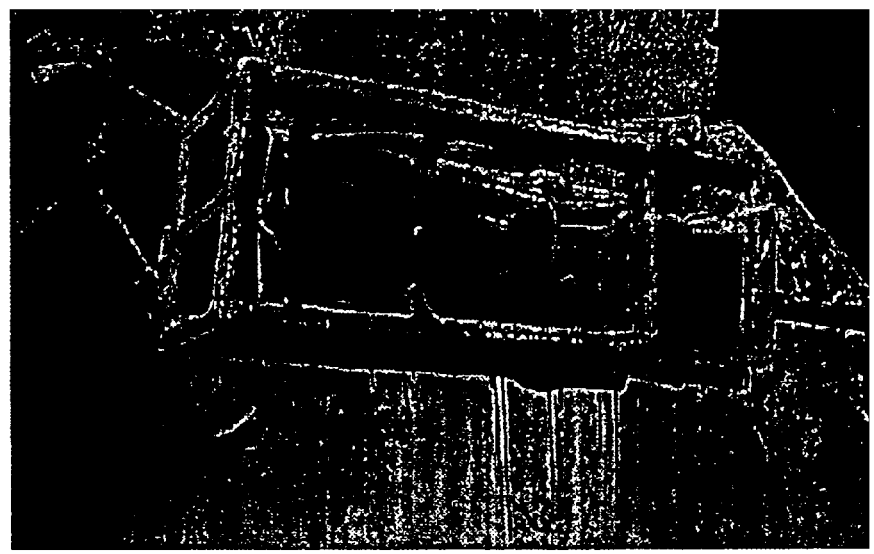
FIG. 19 shows a step in an investment casting process for producing unitary structural member.
Figure 20A:
FIGS. 20A–20B show steps in the investment process following the steps shown in FIG. 19.
Figure 20B:
Figure 21A:
FIGS. 21A–21C show molds for forming a unitary structural member, drying in air.
Figure 21B:
Figure 21C:
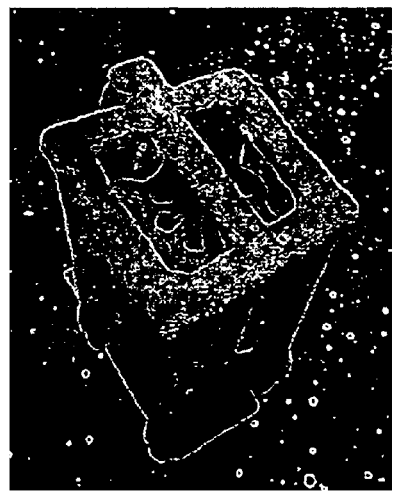

The patterns of a component per se are referred to as the part patterns in ceramic mold casting processes. Complete patterns ready for investment feature gates, runners and other elements that have been attached to the part pattern in order to facilitate the distribution of molten metal and defect-free solidification. These features are generally made out of stock prefabricated wax components and are assembled by hand with foundry glue. These features are generally collectively referred to as the gating. The part patterns for the prototype metal unitary structural member 10 having perforated web portions 12 are shown with their gating attached in FIGS. 18A–18B.

The completed patterns were hand dipped into a variety of slurry and stucco compositions. Slurry and stucco mixtures are typically engineered for initial, intermediate, and later coats so that ceramic molds are produced with excellent cavity wall accuracy, adequate strength, and sufficient permeability. It is most preferable that the first coat be made using fine silica and bonding agents that will ensure very accurate replication of pattern surfaces and details. It is equally preferred that the ceramic shell itself be strong enough to endure handling and the forces applied during casting, but not so thick that it resists contraction forces during solidification, which can cause hot tearing. For the prototype metal unitary structural member, six coats of slurry and stucco were applied and the ceramic shells were approximately ¼ inch thick. Photographs of the investment process are shown in FIGS. 19 and 20A–20B, and FIGS. 21A–21C show a pattern air drying after the initial coat of slurry and stucco.

Once the final slurry and stucco applications were completely dry, the invested patterns were melted and burned out in an autoclave at a temperature of approximately 1650° F. After the resulting ceramic molds had cooled, they were carefully inspected. No defects or cracks were observed and no residual ash was found in the cavity. The resulting ceramic molds were then fired in a furnace to a temperature of 1200° F. immediately before metal casting. The specified 356 Aluminum was cast at a molten temperature of 1275° F.

Figure 22A:
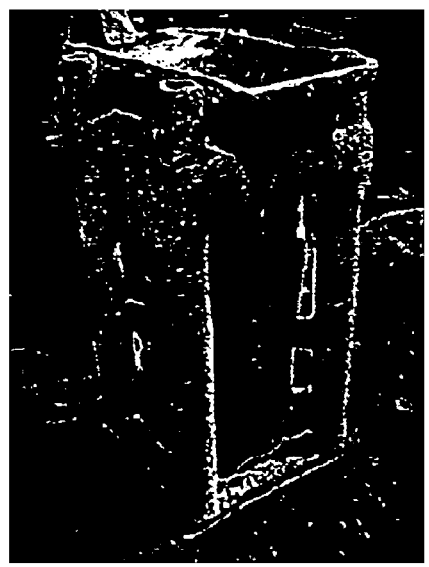
FIGS. 22A–22B show steps in a metal pouring operation.
Figure 22B:

As is normal for investment casting, the fired molds were carried from the furnace using tongs and heat resistant gloves. They were then carefully positioned on sand that had been spread on the floor. Molten aluminum was hand ladled into the molds, and they were each filled in a matter of minutes. The metal pouring operation is shown in FIGS. 22A–22B.

Figure 23A:
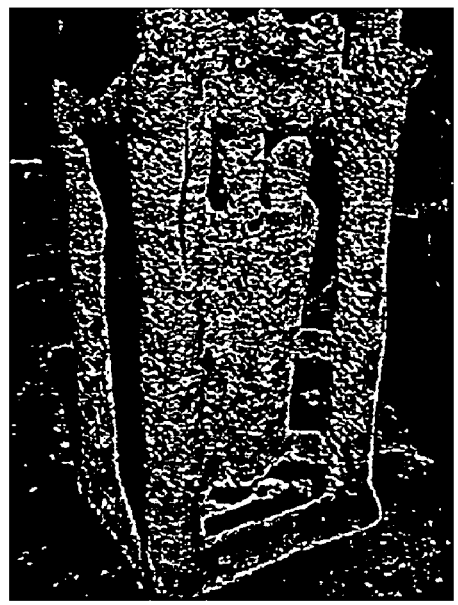
FIGS. 23A–23B show solidifying castings in which the metal has been poured.
Figure 23B:
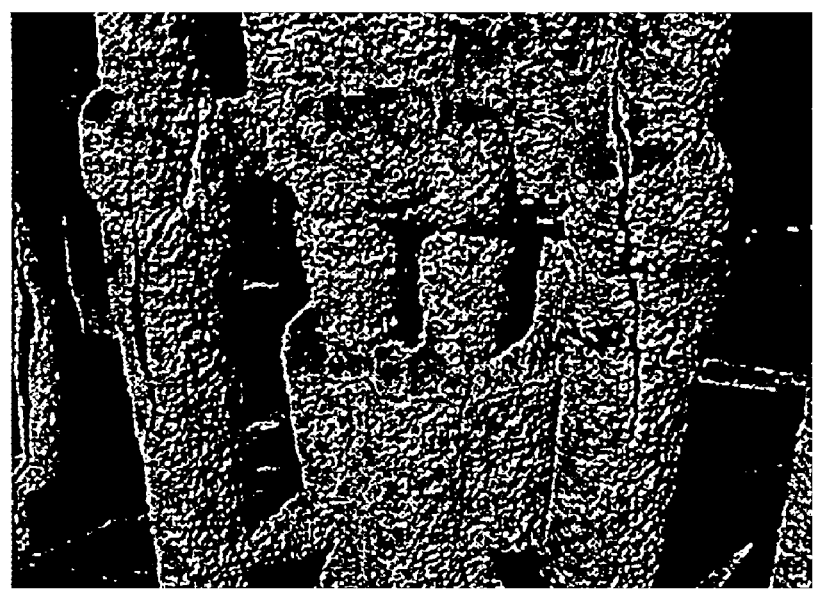
Figure 24A:
FIGS. 24A–24B show steps in destruction of the ceramic mold shown in FIGS. 23A–23B.
Figure 24B:
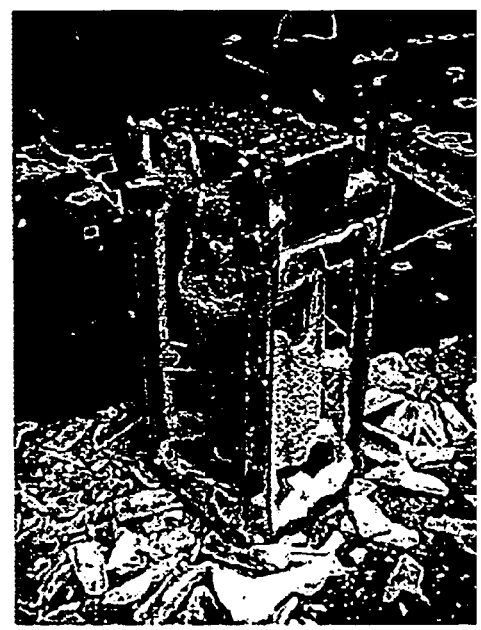
Figure 25:
FIG. 25 shows the unitary structural member in its "as cast" state prior to removal of gating.

As can be seen in FIGS. 23A–23B, the solidifying castings began to fracture the ceramic molds. Most of the external shell for both castings was easily removed by hand and/or with a rubber mallet. The destruction of the ceramic molds is shown in FIGS. 24A–24B. A component for the prototype is shown in its 'as cast' state prior to the removal of gating in FIG. 25.

An important aspect of the design of the metal unitary structural member 10 having perforated web portions 12 is that there is synergy between their unique optimizing features, those required to post-process additively-formed patterns for casting such members, the features necessary for ceramic mold integrity, and the features required to process the invention once it has been investment cast. The need to remove mold or support material from the cavity after an additively-formed pattern is completed and a casting has solidified requires sufficiently-sized openings in the member's 10 ends. The position of these openings at the ends of the members 10 is also optimal in terms of investing the pattern with slurry (which has to drain well from cavities after dipping), air drying each coat, and creating structural bridges between cavity molds and the outer ceramic shell. The perforation of internal webs creates exceptional ceramic mold strength and integrity. In other words, the optimizing features of the metal unitary structural members also significantly enable their indirect manufacture using investment casting.

Figure 26A:
FIGS. 26A–26B show castings for the unitary structural member after, removal of the portion of the gate.
Figure 26B:
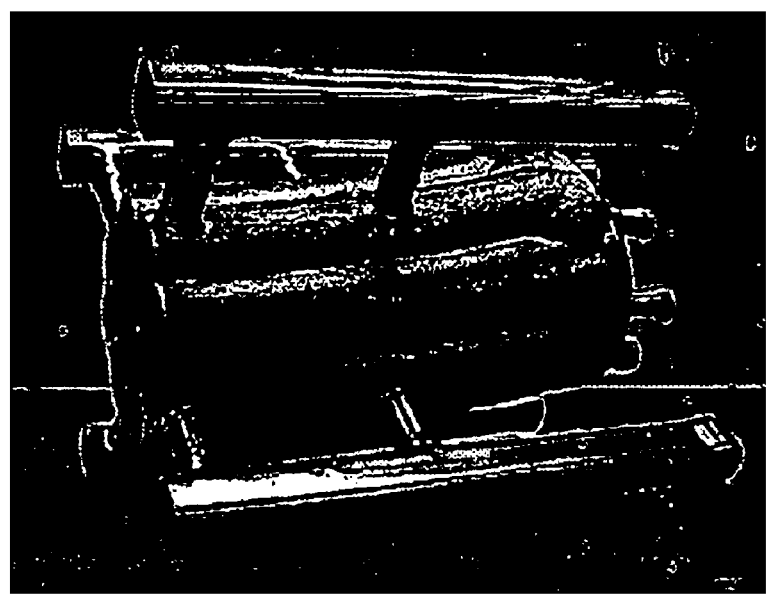
Figure 27A:
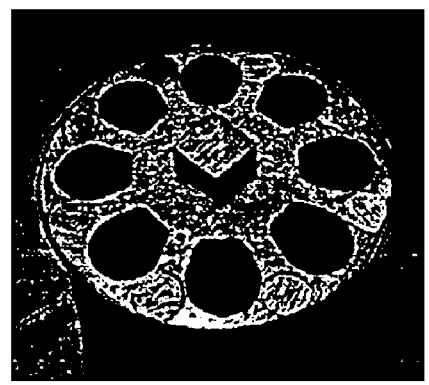
FIGS. 27A–27C show views of the casting of FIGS. 26A–26B after removal of the remainder of the gating.
Figure 27B:
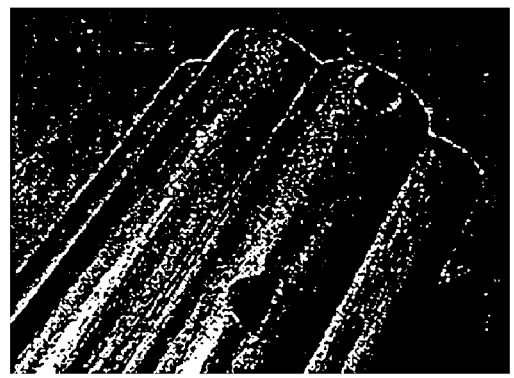
Figure 27C:
Figure 28A:
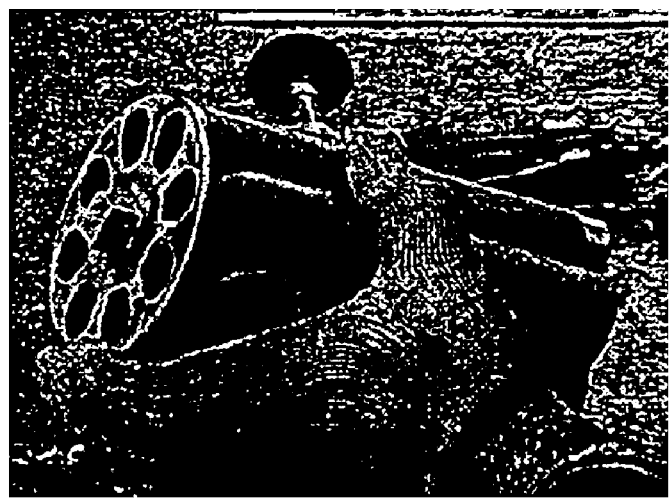
FIGS. 28A–28B show a grinding process for the casting of FIG. 26.
Figure 28B:

The castings for the prototype metal unitary structural member 10 having perforated web portions 12 are shown with some of their gating cut off in FIGS. 26A–26B. Initial removal of the gating was done with a band saw, and this operation left about ¼ inch of each gate on the surface of the castings. Most of this was removed using belt grinding machines, and the results of this process are shown in FIGS. 27A–27C. Each of the gate locations was then carefully blended using hand held grinding devices as shown in FIGS. 28A–28B. Evidence of surface grinds quickly and completely disappeared after the castings were sand blasted, although this was not done until after the two parts had been welded together.

Figure 29A:
FIGS. 29A–29C show steps in welding together a pair of unitary structural members.
Figure 29B:
Figure 29C:
Figure 30:
FIG. 30 shows the welded pair of unitary structural members after the process shown in FIGS. 29A–29C.

In order to be able to present the connection in this prototype in both a welded and a non-welded state, the decision was made to weld two-thirds of the circumference of the joint. The components for the prototype metal unitary structural member having perforated web portions are shown being welded together in FIGS. 29A–29C. The slight discoloration of the welded joint visible in FIG. 30(left) is the result of an immersion heat treatment.

Figure 31A:
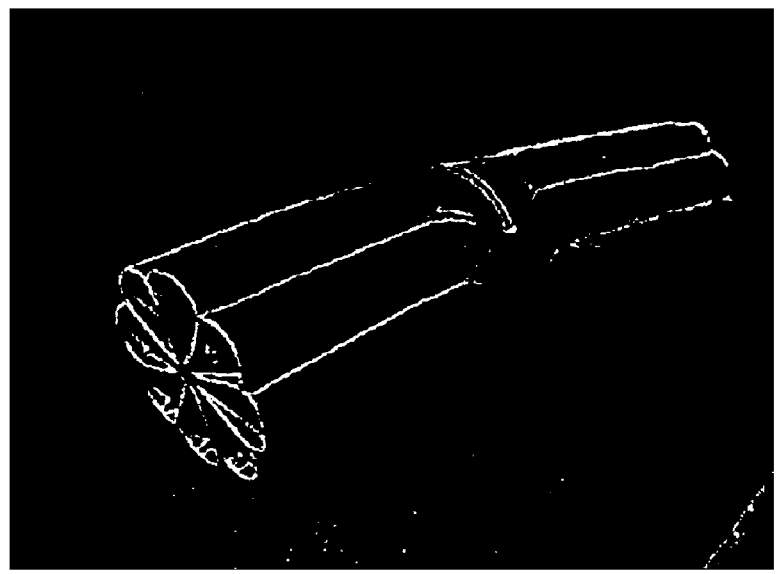
FIGS. 31A–31B show the joined unitary structural members of FIG. 30 during a sandblasting process.
Figure 31B:
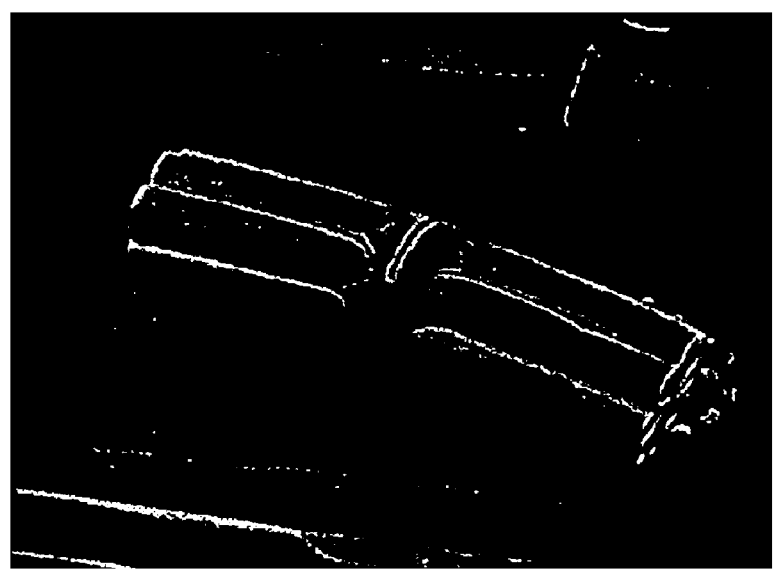

Prior to the specified heat treatments, the prototype metal unitary structural member 10 was sand blasted to provide consistent surface texture and ensure that the gates and weld had been thoroughly blended with adjacent surfaces (i.e. it is difficult to verify surface accuracy because of the markings created during grinding). Photographs of the welded castings during the sand blasting process are shown in FIGS. 31A–31B.

Two heat treatments processes that are typically specified for structural aluminum components and are normally used in conjunction with each other were applied to the prototype metal unitary structural member 10. The first heat treatment process is the T-4 heat treatment, and it involves immersing castings for 24 hours in liquid (mostly water) that is heated to a temperature 100° F. less than the melting point of the alloy (in this case, therefore, 1175° F.). This process permits much more controlled solidification of a casting and results in a higher degree of homogenization among the various alloying ingredients. When a casting is removed from a T-4 heat treatment, it is immediately quenched to 'freeze' the metal in this improved state. The second heat treatment is air-based rather than water-based, and is known as the T-6 process. This process involves placing a casting in a furnace and heating it to a temperature between 300° F. and 350° F. for a few hours to artificially harden the metal and increase its strength. The duration of a T-6 heat treatment is usually a few hours, but the precise time is determined by the foundry based on experience and the part's geometry.

Prior to the castings being welded together, they were inspected visually and using both dye-penetrant and radiographic techniques. Visual and dye-penetrant inspection showed no surface defects, and x-rays indicated that the castings were sound throughout. In fact, both castings easily met the standards of ASTM E155 for structural aluminum castings and what is referred to as '3T sensitivity', which is a standard required of high performance castings for the aerospace industry.

Figure 32A:
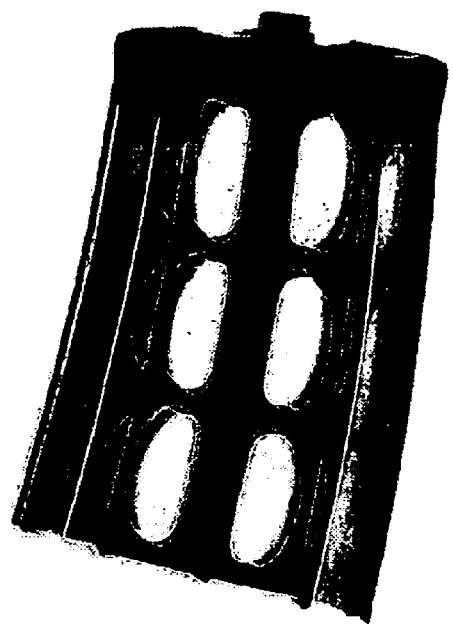
FIGS. 32A–32B show radiographs of the formed unitary structural member.
Figure 32B:
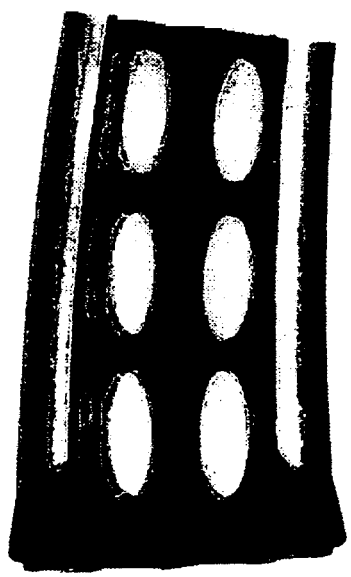

Radiographs of castings that are to be evaluated per ASTM and other standards include a series of slides with three tiny but different sized holes in them. (These slides may be purchased from the American Society for Testing and Materials (ASTM).) Each slide corresponds to a specific casting wall thickness, and because most castings have more than one wall thickness, several different slides are usually required for a given radiograph. The tiny holes in each of these slides are sized relative to a specific casting wall thickness, and they serve to control the interpretation or 'reading' of a radiograph. If these holes are visible on a radiograph, then that means that voids or inclusions in the casting corresponding to the sizes of these holes would also be visible in the radiograph. Because each of these tiny holes has a different diameter or, more loosely, 'thickness', standards are specified based on the number of holes that are visible. The term 'thickness' is generally abbreviated with the letter 'T', and readability standards are therefore specified as '1-T', '2-T' and '3-T'. Most aluminum castings are required to meet 2-T standards, but many small commercial castings are only required to meet 1-T standards. The aerospace industry, NASA, and other businesses making products with stringent performance specifications typically demand 3-T certification. Two radiographs of the metal unitary structural member having perforated web portions are shown in FIGS. 32A–32B. Both of these castings met '3-T' standards.

As described above, in addition to indirect investment casting methods, the present invention contemplates manufacturing the metal unitary structural members 10 using direct methods. The metal unitary structural member 10 having perforated web portions 12 can be directly manufactured using various laser and metal powder based freeform fabrication technologies. These processes use lasers (or sometimes heat from another energy source) to bond metal powders that are delivered through nozzles to the heat source. These methods can be described as layer-based multi-axis CNC metal deposition or welding. Examples of these processes are discussed below.

The metal unitary structural member 10 having perforated web portions 12 can also be semi-directly manufactured using other metal powder-based solid freeform fabrication (SFF) technologies, namely three-dimensional printing (3DP) and selective laser sintering (SLS).

Figure 33:
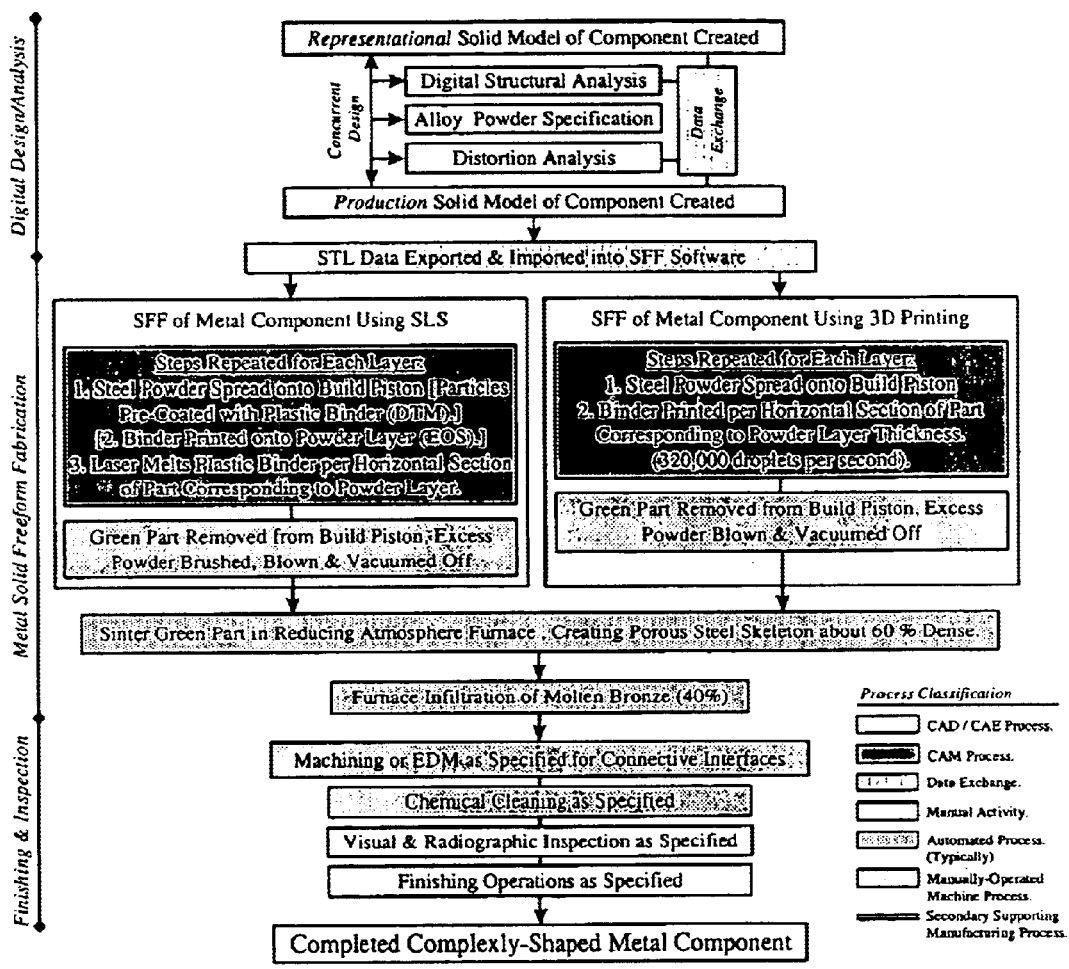
FIG. 33 is a diagram showing the process for indirect additive manufacture of a unitary structural member.

These processes can be considered semi-direct methods of manufacturing metal components because they initially result in skeletal or porous (approximately sixty-percent dense) products that then must be infiltrated with molten metal (typically bronze) to create fully dense parts. At present, these methods, like investment casting, result in material properties that may not be sufficient for some service conditions. However, the companies that manufacture SLS machines that can process metal powders, DTM Corporation and EOS Gmbh, are developing improved materials and processing techniques in an effort to minimize this issue. Extrudehone's ProMetal® Division, which manufactures three-dimensional printing machines specifically for processing metal powders, is also developing improved materials and processes. It is possible that the metal products of SLS and 3DP machines will eventually be able to better capture the strength to weight ratio advantages of the metal unitary structural members 10. Process diagrams for the indirect additive manufacture of metal components using SLS and 3DP are shown in FIG. 33.

Selective laser sintering processes use a carbon dioxide laser to sinter and thereby bond powdered materials. A thin layer of powdered material is spread over a build piston that is lowered incrementally after each layer has been sintered. Each sintered layer represents a horizontal section through the part. Layer thickness controls the accuracy or resolution of the part being built. SLS was first developed for application using powdered polymers, which are readily bonded by the application of heat, but, from a material standpoint, the process is more flexible than most solid freeform fabrication technologies because polymeric binders can be easily added or applied to ceramic or metal powders. Varieties of metal powders that have been coated with polymeric binders are commercially available. SLS machines have build chambers that are approximately 15" by 13" by 18" high.

After an entire part has been sintered, it is removed from the powder and considered to be in a green state. The polymer remaining in green parts is then burned off in a reducing atmosphere furnace, leaving a stainless steel skeleton that is about sixty percent dense. This initial heat treatment also further sinters the metal. Bronze is infiltrated into the steel skeleton in a second heat treatment, creating a part that is fully dense. Metal parts semi-directly manufactured using SLS have a strength and hardness superior to aluminum. Their modulus of elasticity and coefficient of thermal expansion are similar to steel, and they can be easily machined, welded and finished.

A three dimensional printing (3DP) process was invented at MIT and is licensed to several companies. Each of these businesses is developing different material technologies. The ProMetal® Division of Extrude Hone Corporation in Pennsylvania has commercialized the use of metal powders to make tools and components using 3DP. They manufacture a line of solid freeform fabrication devices commercially named ProMetal® machines. These machines have build volumes ranging from 12" by 12" by 10" high to 20" by 36" by 12" high.

ProMetal® machines print a polymeric binder onto layers of powdered stainless steel or tool steel using an ink jet printhead that deposits 320,000 droplets per second. As with SLS, and as indicated in FIG. 32, this produces a green part in a bed of loose powder. The remaining polymeric binder is then burned out in a furnace in a process that also lightly sinters the part. A second heat treatment is used to infiltrate the steel skeleton with molten bronze or a copper alloy, creating a fully dense part. Completed parts are approximately sixty percent steel and forty percent bronze (or copper) and these steel/bronze parts have sufficient material properties for some structural applications. Three dimensionally printed metal parts can be machined, welded and finished as if they were stainless steel parts made using other manufacturing processes.

Embodiments of the metal unitary structural member 10 having perforated web portions 12 may be directly manufactured using solid freeform fabrication technologies that are generally referred to as layer-based metal deposition processes. Various names have been given to specific direct metal freeform manufacturing technologies by those organizations developing or commercializing these processes, and these include laser-engineered net shaping (LENS™), direct metal deposition (DMD™), and laser additive manufacturing (LAM™). All of these processes use nozzles to deliver metal powder or wire to a focused heat source, usually a laser but sometimes another energy source. The nozzles and heat source collectively comprise what is known as the deposition head, and these assemblies are typically manipulated in at least three axes using computer numerical control (CNC) software. In a process very similar to welding, the heat source melts the powder or wire resulting in a small but controllable molten pool that quickly solidifies and bonds with the layer below as the deposition head follows a predetermined computer numerically controlled layer-specific path. As with the majority of solid freeform fabrication technologies, each layer corresponds to a thin horizontal cross-section of the component. Because direct metal deposition processes are essentially multi-axis CNC automated robotically manipulated welding processes, they (like welding) generally result in fully dense products with material properties that match or exceed those found in wrought products generated by deformation processes such as rolling, extrusion or forging. As a result, direct metal deposition processes have the potential to better capture the optimized strength to weight ratio and stiffness advantages of the unitary metal structural members 10.

While the material properties created by most laser and metal powder based freeform fabrication technologies are excellent, the machines and software currently available have significant limitations in terms of their capacity to manufacture the invention. It is anticipated that many of these limitations will be reduced or eliminated as these technologies are further developed, and that they will, therefore, eventually have a greater capacity to manufacture the invention.

A current limitation of most laser and metal powder based freeform fabrication technologies is their inability to build features that overhang at an angle greater than approximately 30 degrees off of vertical orientation. The path planning and build software available with most direct metal processes does not automatically generate temporary support structures, and the only way to remove physically inaccessible temporary supports would be to build them using an alloy with a significantly lower melting temperature than the alloy(s) with which the component per se is made, and then melt the support structures in a heat treatment process. In many instances, the better solution to the present geometric limitations of direct metal deposition processes will be to develop six-axis manipulation that can accurately and predictably deposit metal from any orientation, and to supplement this capacity with path planning software that can successfully sequence the deposition of metal so that unbuilt portions of features do not become inaccessible during the build process. Process is currently being made on developing such solutions to the current geometric limitations of laser and metal powder based direct manufacturing processes.

Commercially available machines manufactured by Optomec, Inc. (LENS™) and Precision Optical Manufacturing (POM), for example, are capable of manufacturing some smaller scale applications of the metal unitary structural members. It is contemplated that further development and application of gantry-based delivery mechanisms and robotically manipulated multi-axis deposition of metal at an equal rate from the top, sides, or bottom of a component, in machines such as fully-functioning direct metal deposition machines currently being developed by Lockheed Martin Aeronautics Company, may be used to manufacture the metal unitary structural member 10 having perforated web portions 12 using direct metal manufacturing processes.

A number of embodiments of the invention, the metal unitary structural member 10 have thus been shown and described, having at least the several advantages described above. A number of methods have also been shown and described for producing various types of embodiments of the metal unitary structural member 10.

While various embodiments of the present invention have been shown and described, it should be understood that other modifications, substitutions, and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A metal unitary structural member, comprising:
   an elongated, axially extending central portion;
   a plurality of web portions extending radially from said central portion and extending in an axial direction along a length of said central portion; and
   a plurality of outer portions extending in said axial direction along a length of said central portion and between said web portions in cross-section, said plurality of outer portions defining an outer surface of the member;
   wherein said plurality of web portions each include a plurality of perforations.

2. The member of claim 1 wherein said plurality of outer portions are arched in cross-section.

3. The member of claim 1 wherein said plurality of perforations are radially disposed between said central portion and said outer surface.

4. The member of claim 1 wherein said perforations are disposed within said plurality of web portions radially symmetrically about said central portion.

5. The member of claim 1 wherein said perforations are axially disposed within said plurality of web portions at axial intervals.

6. The member of claim 1 wherein said central portion is curvilinear.

7. The member of claim 1 wherein said plurality of web portions are curvilinear.

8. The member of claim 1 wherein said plurality of web portions varies in radial length at various axial positions along the member.

9. The member of claim 1 wherein said central portion and said plurality of web portions have a curvilinear radial trajectory.

10. The member of claim 1 wherein said central portion and said plurality of web portions have a linear radial trajectory.

11. The member of claim 1 further including a connecting structure on at least one axial end for connecting to another member.

12. The member of claim 11 wherein said connecting structure includes a connector that is self-registering.

13. A metal unitary structural member comprising:
    a plurality of perforated web portions extending radially from each other and extending with each other in an axial direction; and
    a plurality of outer portions extending in an axial direction with said web portions and extending between said web portions in cross-section, said plurality of outer portions defining a radially outer surface of the member.

14. The member of claim 13 wherein said plurality of outer portions are arched in cross-section.

15. The member of claim 13 wherein said perforations are axially disposed within said plurality of web portions at axial intervals.

16. The member of claim 13 wherein an axis of the member is curvilinear.

17. The member of claim 16 wherein said plurality of web portions have a curvilinear radial trajectory.

18. The member of claim 13 wherein said plurality of web portions varies in radial length at various axial positions along the member.

19. The member of claim 13 wherein said plurality of web portions have a linear radial trajectory.

20. A metal unitary structural member comprising:
    an elongated, axially extending central portion;
    a plurality of web portions extending radially from said central portion and extending in an axial direction along a length of said central portion; and
    an outer surface including a plurality of outer portions extending in an axial direction along a length of said central portion and between said web portions in cross-section, said plurality of outer portions being arched in cross-section;
    wherein said plurality of web portions each include a plurality of perforations.

21. The member of claim 20 wherein said perforations are axially disposed within said plurality of web portions at axial intervals.

22. The member of claim 20 wherein said central portion is curvilinear.

23. The member of claim 20 wherein said plurality of web portions varies in radial length at axial positions along the member.

24. A metal unitary structural member comprising:
an elongated, axially extending central portion;
a plurality of perforated web portions extending radially from said central portion and extending in an axial direction along a length of said central portion; and
a plurality of outer portions extending in an axial direction along a length of said central portion and between said web portions in cross-section, said plurality of outer portions being arched in cross-section, said plurality of outer portions defining an outer surface of the member.

25. The member of claim 24 wherein said central portion is curvilinear.

26. The member of claim 24 wherein said plurality of web portions are curvilinear.

27. The member of claim 24 wherein said plurality of web portions varies in radial length at various axial positions along the member.

28. The member of claim 24 wherein said central portion and said plurality of web portions have a curvilinear axial trajectory.

29. The member of claim 24 wherein said central portion and said plurality of web portions have a linear axial trajectory.

30. A metal unitary structural member, comprising:
an elongated, axially extending central portion;
a plurality of web portions extending radially from said central portion and extending in an axial direction along a length of said central portion; and
a plurality of outer portions extending in said axial direction along a length of said central portion and between said web portions in cross-section, said plurality of outer portions defining a outer surface of the member;
wherein said plurality of web portions varies in radial length at various axial positions along the member.

31. The member of claim 30 wherein said central portion and said plurality of web portions have a curvilinear radial trajectory.

32. The member of claim 30 wherein said central portion and said plurality of web portions have a linear radial trajectory.

33. The member of claim 30 wherein said plurality of outer portions are arched in cross-section.

34. A metal unitary structural member comprising:
an elongated, axially extending central portion;
a plurality of web portions extending radially from said central portion and extending in an axial direction along a length of said central portion;
an outer surface including a plurality of outer portions extending in an axial direction along a length of said central portion and between said web portions in cross-section, said plurality of outer portions being arched in cross-section so that corrugations are formed between said web portions along said outer surface; and
wherein said plurality of web portions each include a plurality of perforations.

35. The member of claim 34 wherein said perforations are axially disposed within said plurality of web portions at axial intervals.

36. The member of claim 34 wherein said central portion is curvilinear.

37. The member of claim 34 wherein said plurality of web portions varies in radial length at axial positions along the member.

\* \* \* \* \*